(12) United States Patent
Hannington

(10) Patent No.: US 7,910,187 B2
(45) Date of Patent: Mar. 22, 2011

(54) ADHESIVE ARTICLES WITH IMPROVED AIR EGRESS

(75) Inventor: Michael E. Hannington, Madison, OH (US)

(73) Assignee: Avery Dennison Corporation, Pasadena, CA (US)

( * ) Notice: Subject to any disclaimer, the term of this patent is extended or adjusted under 35 U.S.C. 154(b) by 812 days.

(21) Appl. No.: 10/596,659

(22) PCT Filed: Aug. 19, 2005

(86) PCT No.: PCT/US2005/029544
§ 371 (c)(1),
(2), (4) Date: Jun. 20, 2006

(87) PCT Pub. No.: WO2006/026189
PCT Pub. Date: Mar. 9, 2006

(65) Prior Publication Data
US 2007/0154670 A1    Jul. 5, 2007

(51) Int. Cl.
*B32B 9/00*    (2006.01)
*B32B 33/00*    (2006.01)
*B41M 5/00*    (2006.01)

(52) U.S. Cl. ............... 428/40.1; 428/42.1; 428/195.1

(58) Field of Classification Search ........... 428/40.1, 428/42.1, 141, 195.1, 317.5
See application file for complete search history.

(56) References Cited

U.S. PATENT DOCUMENTS

| | | | |
|---|---|---|---|
| 5,591,290 A | 1/1997 | Walter et al. | 156/152 |
| 5,650,215 A | 7/1997 | Mazurek et al. | 428/156 |
| 5,897,930 A | 4/1999 | Calhoun et al. | 428/41.8 |
| 6,197,397 B1 | 3/2001 | Sher et al. | 428/42.3 |
| 6,630,049 B2 | 10/2003 | Hannington et al. | 156/289 |
| 7,060,351 B2 | 6/2006 | Hannington | 428/343 |

FOREIGN PATENT DOCUMENTS

| | | |
|---|---|---|
| EP | 1 310 538 | 5/2003 |
| WO | 90/07560 | 7/1990 |
| WO | 01/81080 | 11/2001 |
| WO | 2005/075592 | 8/2005 |

OTHER PUBLICATIONS

U.S. Appl. No. 09/742,653, filed Dec. 21, 2000.
PCT/US2005/029544: PCT International Search Report mailed Mar. 28, 2006.

*Primary Examiner* — Patricia L Nordmeyer
(74) *Attorney, Agent, or Firm* — Avery Dennison Corporation Mentor

(57) ABSTRACT

Methods of making adhesive articles providing air egress by supplying a route for the air to flow out from under the construction are described. One method includes providing a release liner comprising a moldable layer having a release surface and a back surface; applying a first pattern of a first non-adhesive material to a first portion of the release surface; applying a second pattern of a second non-adhesive material to a second portion of the release surface, wherein the second pattern partially overlaps the first pattern; embedding at least one of the first or second non-adhesive materials into the moldable layer, and transferring an adhesive layer having a front and back surface and end edges onto the release liner, wherein the front surface of the adhesive layer is adhered to the release surface of the release liner.

24 Claims, 9 Drawing Sheets

Fig. 3"

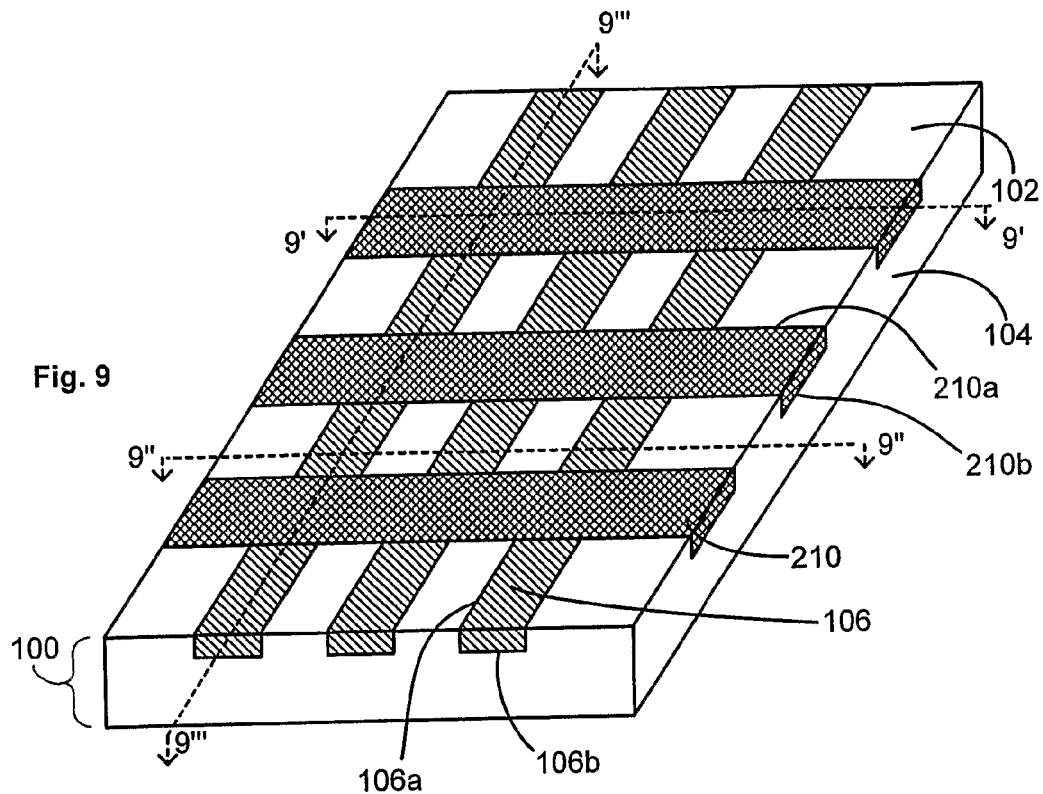
Fig. 9
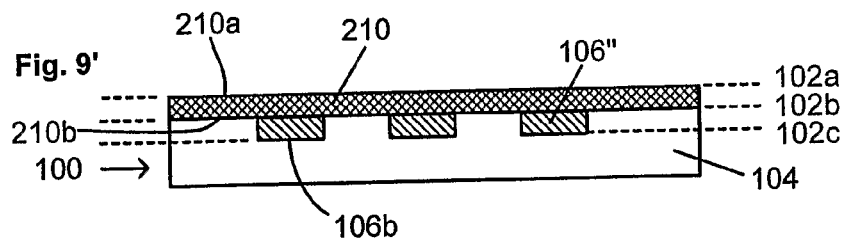
Fig. 9'
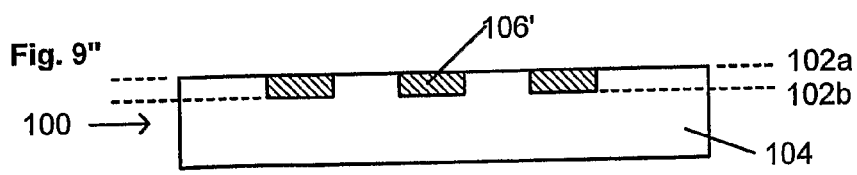
Fig. 9''
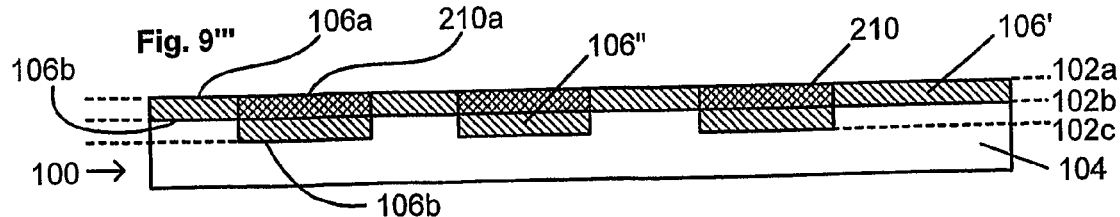
Fig. 9''''

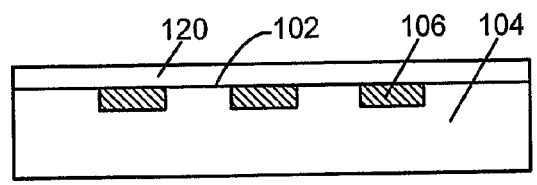
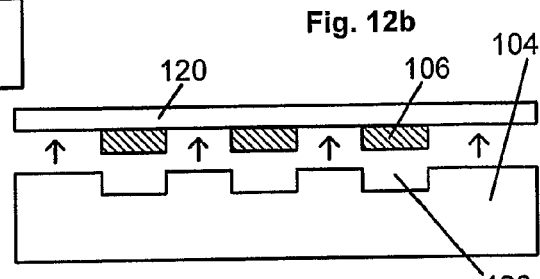
Fig. 12a
Fig. 12b
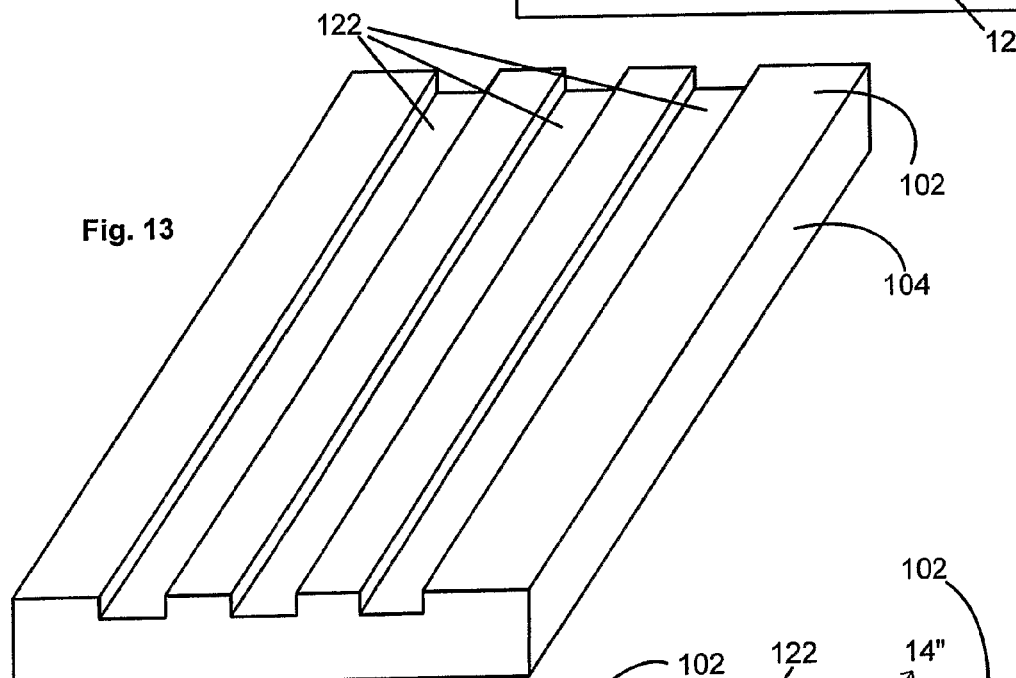
Fig. 13
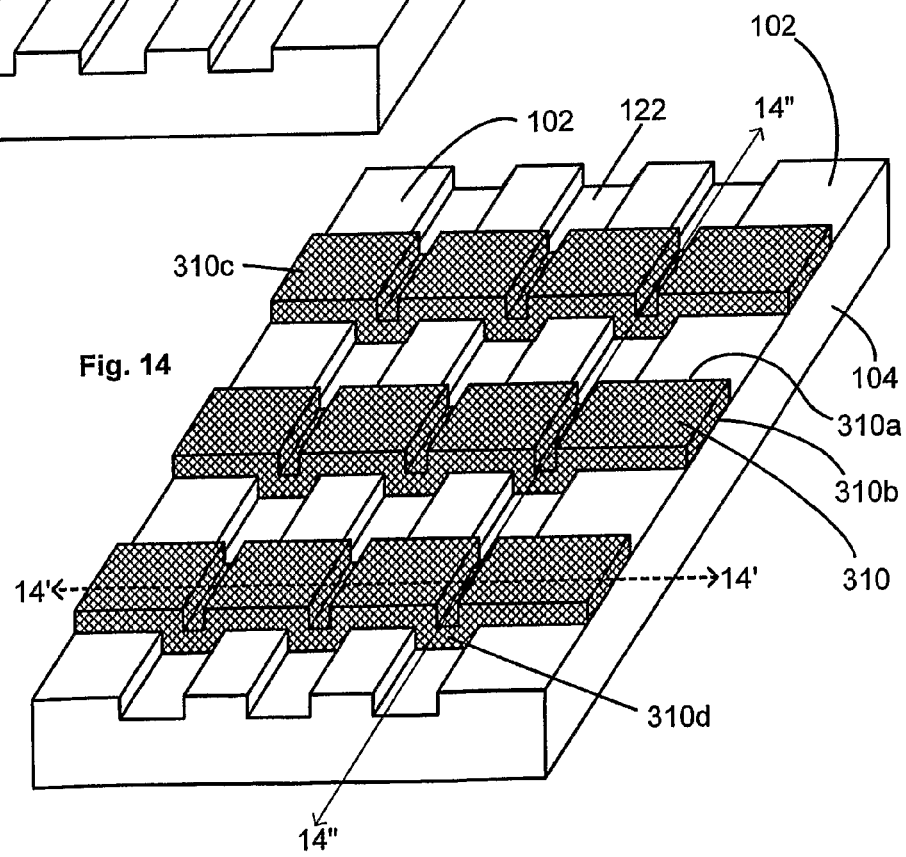
Fig. 14

Fig. 14"

ADHESIVE ARTICLES WITH IMPROVED AIR EGRESS

TECHNICAL FIELD OF THE INVENTION

This invention relates generally to adhesive articles having improved properties such as air egress, repositionability and slideability, and to methods of making the same. Such articles are useful in diverse adhesive applications such as, for example, tapes, labels, industrial graphics applications, articles used for graphic images, such as those used on vehicles, specialty materials for signage, and decorative wall coverings.

BACKGROUND OF THE INVENTION

Pressure sensitive adhesives have enjoyed great acceptance for their convenience of use. The pressure sensitive adhesive is often used for tapes and articles containing graphic images. The advantages of the pressure sensitive adhesives are their strong bonding and simplicity of application. One drawback of these products is the initial tenacity of the pressure sensitive adhesive. The positioning of the product must be precise because of the initial strong bond of the adhesive. A need exists to make such products using pressure sensitive adhesives which are repositionable, i.e. the product may be removed after light application of pressure without damaging the product or the substrate. Similarly, a need exists for the products to be able to slide. Slideability allows for correction of alignment of the product without the need of completely removing the product and possibly damaging the adhesive article or substrate.

When the product is a graphic image and is applied over an area like a wall or truck panel, there is the possibility of trapping air under the product and forming bubbles or wrinkles. In order to avoid such problems, the product should exhibit air egress, i.e. the product should provide a route for air trapped under the product to be removed or to escape.

A need exists for products which have one or more of the desirable properties of air egress, repositionability and slideability.

SUMMARY OF THE INVENTION

This invention relates to an adhesive article which provides at least one of air egress, repositionability and slideability. Air egress is provided by supplying at least one route, such as areas of no initial adhesion or channels in which there is no contact between the adhesive article and the substrate, for the air to flow out from under the construction. The repositionability and slideability are obtained from the presence of areas of no initial adhesion and/or protrusions of non-adhesive materials from the adhesive.

In one embodiment, the invention relates to an adhesive article including (a) a release liner having a release surface, molding layer and a second surface; (b) a continuous layer of adhesive having a first surface, a second surface and end edges, wherein the first surface of the adhesive is adhered to the release surface of the release liner; (c) a first pattern of first non-adhesive material forms having a first surface and a second surface; and a second pattern of second non-adhesive material forms having a first surface and a second surface, wherein the second pattern partially overlaps the first pattern; at least one of the first and second patterns is embedded into the release surface and molding layer of the release liner; the first surface of each of the two patterns is in contact with the adhesive layer; and the first surface of at least a portion of the first pattern of the non-adhesive material forms is in a plane that is different from the plane of the first surface of at least a portion of the second non-adhesive material forms.

The invention further relates to methods of preparing the adhesive articles. One method of making the adhesive articles of the present invention comprises (a) providing a release liner comprising a molding layer having a release surface and a second surface; (b) applying a first pattern of a first non-adhesive material to a first portion of the release surface; (c) applying a second pattern of a second non-adhesive material to a second portion of the release surface wherein the second pattern partially overlaps the first pattern; (d) embedding at least one of the first or second non-adhesive materials into the molding layer; and (e) applying an adhesive layer having a first surface, a second surface, and end edges onto the release liner, wherein the first surface of the adhesive layer is adhered to the release surface of the release liner.

In yet another embodiment, the present invention relates to an adhesive article, comprising a release liner comprising a release surface, a molding layer and a second surface; a continuous layer of adhesive having a first surface, a second surface and end edges, wherein the first surface of the adhesive is adhered to the release surface of the release liner; a first embossed pattern in the release surface and the molding layer of the release liner; and second pattern of a non-adhesive material forms, wherein the second pattern partially overlaps the first embossed pattern and a portion of the second pattern at least partially fills in portions of the first embossed pattern, said embossed pattern and the non-adhesive material forms each having an exposed first surface and a second surface, wherein the exposed first surface of at least a portion of the embossed pattern is in a plane that is different from the plane of the exposed first surface of at least a portion of the second pattern of non-adhesive materials forms.

DESCRIPTION OF THE DRAWINGS

FIGS. 8, 9, 9', 9", 9"', 10 and 11 are perspective and cross sectional views depicting steps of a second embodiment of making an adhesive article including a release liner with a first pattern and a second pattern of a non-adhesive material on the release surface.

FIGS. 12a, 12b, 13, 14, 14', 14", 15 and 16 are perspective and cross sectional views depicting steps of a third embodiment of making an adhesive article including a release liner with a first embossed pattern and a second pattern of a non-adhesive material on the release surface.

Figure 1:
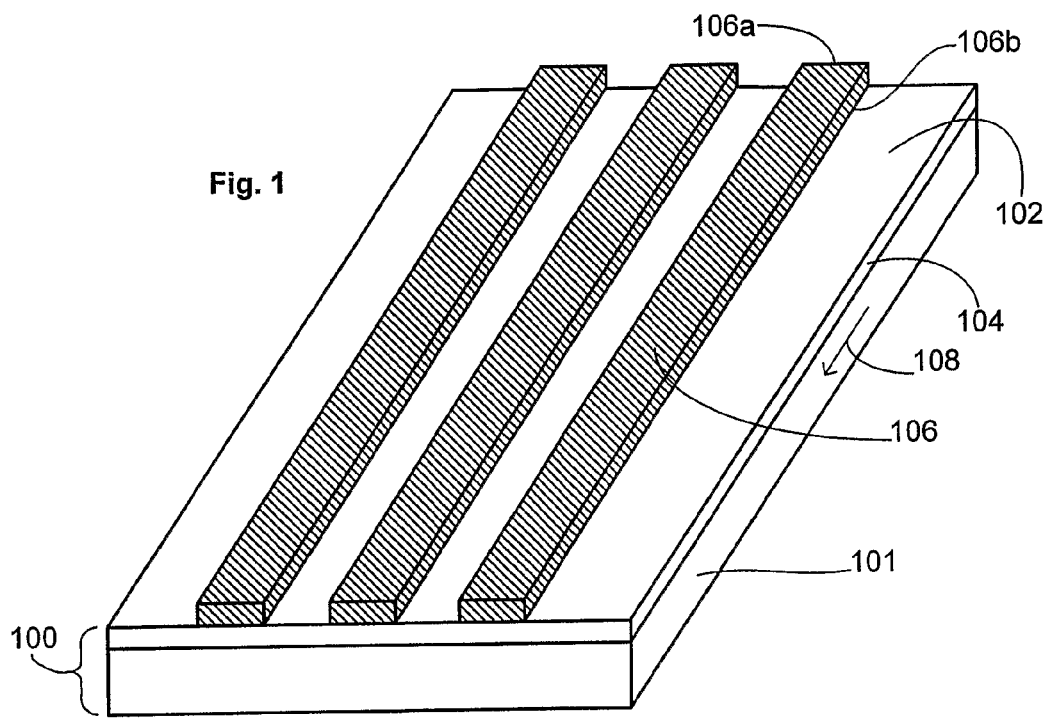
FIG. 1 is a perspective view depicting a release liner to which a first pattern of a non-adhesive material has been applied, in accordance with the present invention.

It should be appreciated that for simplicity and clarity of illustration, elements shown in the Figures have not necessarily been drawn to scale. For example, the dimensions of some of the elements may be exaggerated relative to each other for clarity. Further, where considered appropriate, reference numerals have been repeated among the Figures to indicate corresponding elements.

DETAILED DESCRIPTION

It should be appreciated that the process steps and structures described below do not form a complete process flow for manufacturing a complete adhesive article. The present invention can be practiced in conjunction with techniques currently used in the art, and only so much of the commonly practiced process steps are included as are necessary for an understanding of the present invention.

As used herein, the term "textured", when used in reference to a surface feature, means that the surface has a regular or repeating texture applied to the surface. As used herein, the term "matte", when used in reference to a surface feature, means that the surface has a random, roughened surface. These terms are defined to include surface elements which are formed as a result of processes applied to the surface beyond, or in addition to, the processes used to form the surface. In other words, the texture or the matte condition can be applied in a step separate from the step of forming the surface per se.

In one embodiment, the adhesive articles of the invention comprise
a release liner comprising a release surface, a molding layer and a second surface;
a continuous layer of adhesive having a first surface, a second surface and end edges, wherein the first surface of the adhesive is adhered to the release surface of the release liner;
a first pattern of first non-adhesive material forms having a first surface and a second surface; and
a second pattern of second non-adhesive material forms having a first surface and a second surface, wherein the second pattern partially overlaps the first pattern; at least one of the first and second patterns is at least partially embedded in the release surface and molding layer of the release liner; the first surface of each of the two patterns is in contact with the release surface of the release liner, the second surface of each of the two patterns is in contact with the adhesive layer; and the first surface of at least a portion of the first pattern of non-adhesive material forms is in a plane that is different from the plane of the first surface of at least a portion of the second pattern of non-adhesive material forms.

In another embodiment, the adhesive articles of the invention comprise a release liner comprising a release surface, a molding layer and a second surface; a continuous layer of adhesive having a first surface, a second surface and end edges, wherein the first surface of the adhesive is adhered to the release surface of the release liner; a first embossed pattern in the release surface and the molding layer, and a second pattern of a non-adhesive material forms wherein the second pattern partially overlaps the embossed first pattern and a portion of the second pattern at least partially fills in portions of the first embossed pattern, said embossed pattern and the non-adhesive material forms having an exposed first surface and a second surface, wherein the exposed first surface at least a portion of the embossed pattern is in a plane that is different from the plane of the exposed first surface of at least a portion of the non-adhesive material forms.

In another embodiment the adhesive articles do not contain a release liner. In one embodiment, such adhesive articles may be described as comprising a continuous layer of adhesive having a first surface, a second surface and end edges, and a first pattern of first non-adhesive material forms and a second pattern of second non-adhesive material forms wherein the second pattern partially overlaps the first pattern; at least one of said first and second patterns is at least partially embedded in the first surface of the adhesive layer; each of said first and second patterns has an exposed first surface and an opposite second surface that is in contact with the adhesive; the first surface of at least a portion of the first pattern of non-adhesive forms is in a plane that is different from the plane of the first surface of at least a portion of the second pattern of non-adhesive forms; and at least a portion of the first pattern protrudes from the first surface of the adhesive layer.

In another embodiment, the adhesive article of the invention comprises a continuous layer of adhesive having a first surface and a second surface, and a first embossed pattern in the first surface of the adhesive layer, and
a second pattern of non-adhesive material forms, wherein the second pattern at least partially overlaps the first pattern and is embedded in the first surface of the adhesive layer; each of said embossed pattern and second pattern has an exposed first surface wherein the first surface of at least a portion of the first embossed pattern is in a plane that is different from the plane of the first surface of at least a portion of the second pattern of non-adhesive forms.

One of the features of the present invention is that the first surface of at least a potion of the first pattern of non-adhesive material forms present in the adhesive articles is in a plane that is different from the plane of the first surface of at least a portion of the second pattern of non-adhesive material forms as will be discussed in more detail below in relation to the figures.

Release liners useful in the adhesive articles and methods of present invention may be those known in the art which include a molding layer having a release surface and a second surface. A molding layer is a layer into which a non-adhesive material, such as those disclosed herein, may be imbedded by the methods disclosed herein and which are known in the art. Thus, in one embodiment, the release liners useful in the invention may comprise a layer of moldable material having at least one surface that inherently has release properties. For example, a layer of low density polyethylene having release characteristics can be used as the release liner in the adhesive articles and methods of the invention.

Alternatively, when the molding layer does not inherently have sufficient release characteristics, one or more surfaces of the molding layer can be coated with a release composition. Release compositions are known in the art and such compositions include a variety of silicone compositions. In yet another embodiment, the release liners useful herein comprise a substrate or base layer having a molding layer on one side, and a release coating covering the molding layer. The molding layer may be a polyolefin such as polyethylene and polypropylene. Examples of such release liners include polyethylene coated papers with a commercial silicone release coating and polyethylene coated polyethylene terephthalate films with a commercial silicone release coating. In one embodiment, the release liner is kraft paper which has a coating of low density polyethylene on the front side with a silicone release coating on the polyethylene, and a coating of high density polyethylene on the back side. Other release liners known in the art are also suitable as long as they contain a molding layer and are selected for their release characteristics relative to the adhesive chosen for use in the present invention. In one embodiment of the invention, the release liner has a molding layer of polymer under the release coating, which softens upon the application of heat, allowing the non-adhesive material to be embedded into the molding layer of the release liner. Embedding the non-adhesive material into the release liner maintains the three-dimensional stability of the printed pattern and protects the pattern during handling, storage and transport of the adhesive article.

The release surface of the release liner may have a textured finish, a matte finish, a smooth finish, or a patterned finish. The release layer may have a randomly microstructured surface such as a matte finish, or have a pattern of three-dimensional microstructures. The microstructures may have a cross-section which is made up of circles, ovals, diamonds, squares, rectangles, triangles, polygons, lines or irregular shapes, when the cross-section is taken parallel to the surface of the release surface. The release liner may also have randomly distributed non-adhesive particulate material applied to the surface of the release surface. The non-adhesive particulate is then embedded into the release liner along with the patterned non-adhesive material.

In one embodiment, the release liner useful in the adhesive articles and method of the invention has a release coating on both sides; and in another embodiment, one side has a release coating of a higher release value than the release coating of the other side.

The adhesive articles of the invention also comprise a continuous adhesive layer which may comprise a pressure sensitive adhesive and/or a heat activated adhesive. The adhesive layer typically has a thickness from about 10 μm to about 125 μm, or from about 25 μm to about 75 μm, or from about 10 μm to about 50 μm. In one embodiment, the coat weight of the pressure sensitive adhesive is in the range of about 10 to about 50 grams per square meter (gsm), and in one embodiment about 20 to about 35 gsm.

In one embodiment, the first surface of the adhesive layer of the articles has a Sheffield roughness of at least about 10 or at least about 75, or at least about 150. The adhesive layer may itself have the roughness or may be formed when the adhesive is coated onto a release liner. It is understood that the release liner may have a Sheffield roughness at least about 10 or at least about 50, or at least about 75 or at least about 150. The adhesive will replicate the complementary texture or pattern of the release liner. Alternatively, the surface of the release liner can be rougher depending on the desired configuration of the adhesive article. The Sheffield roughness is determined by TAPPI T 538 om-88.

The pressure-sensitive adhesives can be any of the pressure sensitive adhesives known in the art. These include rubber based adhesives, acrylic adhesives, vinyl ether adhesives, silicone adhesives, and mixtures of two or more thereof. Included are the pressure sensitive adhesive materials described in "Adhesion and Bonding", *Encyclopedia of Polymer Science and Engineering*, Vol. 1, pages 476-546, Interscience Publishers, 2nd Ed. 1985, the disclosure of which is hereby incorporated by reference. The pressure sensitive adhesive materials that are useful may contain as a major constituent an adhesive polymer such as acrylic type polymers, block copolymers, natural, reclaimed or styrene butadiene rubbers, tackified natural or synthetic rubbers, random copolymers of ethylene and vinyl acetate, ethylene-vinyl-acrylic terpolymers, polyisobutylene, poly(vinyl ether), etc. The pressure sensitive adhesive materials are typically characterized by glass transition temperatures in the range of about −70° C. to about 10° C.

Other materials may be included in the pressure sensitive adhesive materials. These include solid tackifying resins, liquid tackifiers (often referred to as plasticizers), antioxidants, fillers, pigments, waxes, etc. The adhesive materials may contain a blend of solid tackifying resins and liquid tackifying resins (or liquid plasticizers). Particularly useful adhesives are described in U.S. Pat. Nos. 5,192,612 and 5,346,766 which are incorporated herein by reference.

The layer of pressure sensitive adhesive can be applied using standard coating techniques, such as transfer coating, curtain coating, gravure coating, reverse gravure coating, offset gravure coating, roller coating, brushing, knife-over roll coating, air knife coating metering rod coating, reverse roll coating, doctor knife coating, dipping, die coating, spraying, and the like. The application of these coating techniques is well known in the industry and can effectively be implemented by one skilled in the art. The knowledge and expertise of the manufacturing facility applying the coating determine the preferred method. Further information on coating methods can be found in "Modern Coating and Drying Technology", by Edward Cohen and Edgar Gutoff, VCH Publishers, Inc., 1992. Alternatively, an adhesive layer can be applied by transfer of an adhesive layer on a release liner by procedures known to those skilled in the art.

The non-adhesive materials of the at least two patterns may be the same or different. In one embodiment, the non-adhesive material includes non-adhesive polymers, including ink compositions, applied by printing methods. In another embodiment, the non-adhesive material e.g., a metal or metallic or metal-containing material is applied by vacuum metallization or by sputtering. The non-adhesive material, after drying, cooling, and/or curing, releasably adheres to the release surface of the release liner. In one embodiment, the non-adhesive composition used to form the patterns contains greater than 50%, or greater than 75%, or greater than 85% solids. In another embodiment, the non-adhesive composition is 100% solids. Here and elsewhere in the specification and claims, the limits of the ranges and ratios may be combined.

In one embodiment, the non-adhesive material can be any material that can be used as the ink on a printing machine, provided that upon drying, cooling, and/or curing, the non-adhesive material is not tacky. The non-adhesive material may be made of organic polymeric material such as polyurethane, polyvinyl chloride, acrylic polymers, acetate, polyethylene, polypropylene or polystyrene and the like.

In one embodiment, the non-adhesive composition is a UV curable ink. The ultraviolet radiation curable inks useful in the invention generally comprise a binder which comprises one or more photopolymerizable monomers. The photopolymerizable monomers generally are ethylenically unsaturated compounds. The unsaturated compounds may contain one or more olefinic double bonds, and they may be low molecular weight compounds, (monomeric) or high molecular weight compounds (oligomeric). Illustrative examples of monomers containing one double bond are acrylates such as alkyl(meth)acrylates or hydroxyalkyl(meth)acrylates such as methyl-, ethyl-, butyl-, 2-ethylhexyl- or 2-hydroxyethylacrylate, isobornylacrylate, methyl- or ethylmethacrylate. Further examples of photopolymerizable monomers are acrylonitrile, acrylamide, methacrylamide, N-substituted (meth) acrylamides, vinyl esters such as vinyl acetate, vinyl ethers such as isobutylvinyl ether, styrene, alkylstyrenes and halostyrenes, N-vinylpyrrolidone, vinyl chloride or vinylidene chloride.

Monomers containing a plurality of double bonds are typically the diacrylates of ethylene glycol, 1,3-propylene glycol, 1,4-butanediol, 1,4-cyclohexane diol, neopentyl glycol, hexamethylene glycol, or bisphenol A polyacrylates such as trimethylolpropane triacrylate and pentaerythritol triacrylate or tetraacrylate, vinyl acrylate, divinyl benzene, divinyl succinate, diallyl phthalate, triallylphosphate, triallylisocyanurate or tris(2-acryloyloxy)ethyl-isocyanurate.

Typical examples of high molecular weight (oligomeric) polyunsaturated compounds are acrylated epoxy resins, acrylated polyethers, acrylated polyurethanes or acrylated polyesters. Further examples of unsaturated oligomers are unsaturated polyester resins which are normally prepared from maleic acid, phthalic acid and one or more diols and which have molecular weights of about 500 to about 3000. Such unsaturated oligomers may also be referred to as prepolymers. Single component systems based on photocurable prepolymers are often used as binders for printing inks. Unsaturated polyester resins are normally used in two-component systems together with a monounsaturated monomer such as described above, preferably with styrene.

The unsaturated compounds also can be used in admixture with non-photopolymerizable film-forming components. These components may typically be drying polymers or their solutions in organic solvents, such as nitrocellulose. They may also, however, be chemically curable or thermocurable resins such as polyisocyanates, polyepoxides or melamine resins. The concomitant use of thermocurable resins is important for use in so-called hybrid systems which are photopolymerized in a first step and crosslinked by a thermal after treatment in a second step.

The UV radiation curable inks also should contain at least one photoinitiator. A wide range of different photoinitiators is at present available for UV radiation curable systems. They include benzophenone and benzophenone derivatives, benzoin ethers, benzil ketals, dialkoxyacetophenones, hydroxyacetophenones, aminoacetophenones, haloacetophenones or acryloxyphosphine oxides. They differ in that they have different absorption maxima. To cover a wide absorption range it is possible to use a mixture of two or more photoinitiators. The total amount of photoinitiator in the UV radiation curable compositions may be in the range of from about 0.05 to about 7, or 10% by weight of the total composition. Preferably the compositions contain from about 0.2% to about 5% by weight of the photoinitiator.

Amines may be added to accelerate the photopolymerization, for example triethanolamine, N-methyl-diethanolamine, p-dimethylaminobenzoate or Michler's ketone. The photopolymerization can further be accelerated by the addition of photosensitizers which displace or broaden the spectral sensitivity. These photosensitizers are preferably aromatic carbonyl compounds such as thioxanthone, anthraquinone and 3-acyl-coumarin derivatives as well as 3-(aroylmethylene)-thiazolines.

Hindered amine light stabilizers (HALS) which function as co-stabilizers, also may be added to the UV radiation curable printing compositions used in the present invention. Examples of hindered amine light stabilizers include those listed and recited in U.S. Pat. Nos. 5,112,890 and 4,636,408, which are incorporated herein by reference. A specific example of a hinder amine light stabilizer useful in the printing inks is TINUVIN® 292 which is identified as bis(1,2,2,6,6-pentamethyl-4-piperidinyl) sebacate.

In addition to the above described binder materials and photoinitiators, the UV radiation curable inks used in the present invention may also contain coloring matter selected from organic pigments, inorganic pigments, body pigments and dyes which are known and have been used in this art. Examples of useful pigments include titanium dioxide, cadmium yellow, cadmium red, cadmium maroon, black iron oxide, carbon black, chrome green, gold, silver, aluminum and copper. Examples of dyes include alizarine red, Prussian blue, auramin naphthol, malachite green, etc. Generally the concentration of the pigment or dye in the ink will be from about 0 to about 70% by weight, and in one embodiment, from about 0.1% to about 50% by weight.

In addition to the above described coloring matter, the UV radiation curable inks used in the present invention may also contain fillers, extenders, surfactants, and the like which are known and have been used in this art. Examples of useful fillers and extenders include silicon dioxide, fumed silica, glass or ceramic microspheres, and glass orceramic bubbles. Generally the concentration of the filler or extender will be from about 0 to about 70% by weight, and in one embodiment, from about 0.5% to about 50% by weight.

The printing inks may also contain at least one UV absorber which provides weathering protection and helps prevent microcracking. The amount of UV absorber included in the UV radiation curable ink should be maintained at a practical minimum since the presence of the UV absorber may increase the curing rate. A variety of UV absorbers are known and useful in the present invention and these include UV absorbers belonging to the group of photopolymerizable hydroxybenzophenones and photopolymerizable benzotriazoles. U.S. Pat. No. 5,369,140 describes a class of 2-hydroxyphenyl-s-triazines that are useful as UV absorbers for radiation curable systems. The triazines are effective for stabilizing cured films when exposed to sunlight over a long period of time, and these stabilizers do not interfere with UV radiation curing of the inks. The triazine UV absorbers are effective in amounts of from about 0.1 to about 2% by weight. The UV absorbers may be used in combination with other light stabilizers such as sterically hindered amines. The disclosure of the '140 patent is hereby incorporated by reference for its disclosure of such UV absorber combinations. U.S. Pat. Nos. 5,559,163 and 5,162,390 also describe UV absorbers which are useful in the inks of the present invention.

Examples of useful UV curable inks include those available from Decochem under the trade designation Poly-Rad plastics, as well as UV curable inks commercially available from Acheson and Daw Chemical Company.

In one embodiment of the invention, the ink used to form the non-adhesive patterns on the release liner is a coalescing ink. The ink does not efficiently wet out on the surface of the release liner, but coalesces into smaller areas of ink with an increase in height. Thus, depending on the degree of coalescence, a line of printed ink can form a narrower line, or a line made up of what appear to be random small beads of ink, or a combination, all with an increase in height. The narrower line, small beads, or combination are then embedded into the release liner. The thickness of the ink applied to the surface of the release liner can also affect the degree of coalescence. Surfactants may be added to the ink composition to control the degree of coalescence as well.

In one embodiment of the invention, the ink used to form the non-adhesive patterns comprises a porous non-adhesive. The porous non-adhesive may have elastomeric properties, so that if it is compressed, it essentially returns to its original shape. For example the porous non-adhesive comprises an ink containing a blowing agent that causes the ink to expand, forming an open or closed cell, or combination thereof. The blowing agent is activated, for example, by the application of heat to the ink. Other examples of porous non-adhesives include suspensions of gas and/or particles in a binder.

Substances which can be deposited by the sputtering or metallization processes also can be used to form the non-adhesive patterns in the adhesive articles of the invention. Examples of such metals include: aluminum, silver, gold, chrome, copper and nickel.

As noted, in one embodiment, the adhesive articles of the present invention comprise a first pattern of a first non-adhesive material forms and a second pattern of a second non-adhesive material forms. The present invention may include additional patterns of non-adhesive material. The present invention may further include additional non-adhesive materials randomly distributed, i.e., in no regular pattern. The non-adhesive materials of the two or more patterns may be the same or different. The patterns, independently, can be a plurality of dots, lines or bars, continuous or broken, etc. provided one partially overlaps the other pattern. In one embodiment, when lines are used, at least about 50% of the lines extend and intersect the end to edges of the adhesive layer to provide improved air egress. The lines may vary in size provided that air egress is maintained. The lines and other patterns generally have an average thickness from about 0.3 microns (μm) to about 100 μm, or from about 0.5 μm to about 50 μm, or from about 3 μm to about 30 μm. The width of the lines may also vary widely. An example of a useful range for line width is from about 12 μm to about 250 μm, or from about 25 μm to about 125 μm, or from about 50 μm to about 75 μm. The pattern may be a grid of intersecting lines, a weave pattern, a waffle pattern, diagonal straight and curved lines, tiled geometric figures, such as hexagons, rectangles, overlapping circles or triangles, or lines in a cross hatch pattern. In addition to the patterns that may be used such as a grid of intersecting lines, dots and other random shapes may be embedded in the molding layer of release liner to increase desirable properties such as air egress, repositionability and slideability.

In one embodiment, the non-adhesive material is an ink comprising a UV curable polymer composition, such as a UV curable acrylic or polyurethane composition. After application, the ink is cured by irradiation in a UV exposure apparatus as is well known to those skilled in the art of printing and UV curing. UV light sources such as low pressure mercury lamps, high pressure mercury lamps, xenon lamps, arc lamps and gallium lamps are useful. It is also possible, but not necessary, to improve the curability of the ink by heating after irradiation.

In one embodiment, the non-adhesive material is a polymer composition which is able to be printed by any suitable printing technique such as screen printing, roller coat printing, flexographic printing, lithographic printing, gravure printing, laser printing, ink jet printing, brushing, spraying, dipping or coating. The type of printing may be any type which can print on the release liner. One particularly useful printing method is a modification of flexographic printing which provides both the printing and embedding of the non-adhesive material.

The non-adhesive material may also be applied to the release liner by means of patterned vacuum metallization or sputtering. In this embodiment, the non-adhesive layer typically has a thickness from about 30 nanometers (nm) to about 3000 nm, from about 100 nm to about 2000 nm, or from about 300 nm to about 1500 nm.

As described above, the adhesive articles may optionally comprise a facestock. In one embodiment, a facestock may be applied to the second surface of the adhesive layer which has already been releasably adhered to a release liner. Alternatively, a combination of a facestock and an adhesive may be applied to the release liner. The facestock may be any of those which are useful for decorative or graphic image applications. The facestocks typically have a thickness from about 10 μm to about 300 μm, or from about 25 μm to about 125 μm. The facestocks include paper, polyolefins (linear or branched), polyamides, polystyrenes, nylon, polyesters, polyester copolymers, polyurethanes, polysulfones, polyvinylchloride, styrene-maleic anhydride copolymers, styrene-acrylonitrile copolymers, ionomers based on sodium or zinc salts of ethylene methacrylic acid, polymethyl methacrylates, cellulosics, fluoroplastics, acrylic polymers and copolymers, polycarbonates, polyacrylonitriles, and ethylene-vinyl acetate copolymers. Included in this group are acrylates such as ethylene methacrylic acid, ethylene methyl acrylate, ethylene acrylic acid and ethylene ethyl acrylate. Also, included in this group are polymers and copolymers of olefin monomers having, for example, 2 to about 12 carbon atoms, and in one embodiment 2 to about 8 carbon atoms. These include the polymers of alpha-olefins having from 2 to about 4 carbon atoms per molecule. These include polyethylene, polypropylene, poly-1-butene, etc. An example of a copolymer within the above definition is a copolymer of ethylene with 1-butene having from about 1 to about 10 weight percent of the 1-butene comonomer incorporated into the copolymer molecule. The polyethylenes that are useful have various densities including low, medium and high density ranges. The low density range is from about 0.910 to about 0.925 g/cm$^3$; the medium density range is from about 0.925 to about 0.940 g/cm$^3$; and the high density range is from about 0.94 to about 0.965 g/cm$^3$. Films prepared from blends of copolymers or blends of copolymers with homopolymers also are useful. The films may be extruded as a monolayer film or a multi-layered film.

In one embodiment, the facestock is a polymeric facestock, which contains migratory additives. The facestocks are preferably polyvinylchloride facestocks. The additives include plasticizers and antioxidants. The plasticizer is a high-boiling solvent or softening agent, usually liquid. It is an ester made from an anhydride or acid and a suitable alcohol that usually has between 6 to 13 carbon atoms. The plasticizers may be adipate, phosphate, benzoate or phthalate esters, polyalkylene oxides, sulfonamides, etc. The plasticizers include but are not limited to DOA plasticizer (dioctyl adipate), TEG-EH plasticizer (triethylene glycol di-2-ethylhexanoate), TOM plasticizer (trioctyl trimellitate), triacetin plasticizer (glyceryl triacetate), TRIB. plasticizer (2,2,4-trimethyl-1,3-pentanediol diisobutyrate), DEP plasticizer (diethyl phthalate), DOTP plasticizer (dioctyl terephthalate), DMP plasticizer (dimethyl phthalate), DOP plasticizer (dioctyl phthalate), DBP plasticizer (dibutyl phthalate), polyethylene oxide, toluenesulfonamide, dipropylene glycol benzoate, and the like.

In one embodiment, the adhesive articles of the invention may be prepared by (a) providing a release liner comprising a molding layer having a release surface and a second surface;

(b) applying a first pattern of a first non-adhesive material to a first portion of the release surface;

(c) applying a second pattern of a second non-adhesive material to a second portion of the release surface, wherein the second pattern partially overlaps the first pattern;

(d) embedding at least one of the first or second non-adhesive materials into the molding layer; and (e) applying an adhesive layer having a first surface and a second surface onto the release liner, wherein the first surface of the adhesive layer is adhered to the exposed portions of the non-adhesive materials and to the release surface of the release liner.

After the adhesive layer is applied, the release liner may be removed to provide adhesive articles of other embodiments of the invention as described herein.

In another embodiment, (hereinafter sometimes referred to as the "first embodiment"), only the first pattern of non-adhesive material is embedded into the molding layer, i.e., the first pattern of non-adhesive materials forms is embedded in the molding layer before the second pattern of non-adhesive material forms is applied to the release liner. Thus, the process of the first embodiment comprises (a) providing a release liner comprising a molding layer having a release surface and a second surface;

(b) applying a first pattern of a first non-adhesive material to a first portion of the release surface;

(c) embedding the first pattern of a first non-adhesive material into the molding layer, (d) applying a second pattern of a second non-adhesive material to a second portion of the release surface wherein the second pattern partially overlaps the first pattern, and (e) applying an adhesive layer having a first surface and a second surface onto the release liner, wherein the first surface of the adhesive layer is adhered to the exposed portions of the non-adhesive materials and to the release surface of the release liner.

Figure 2:
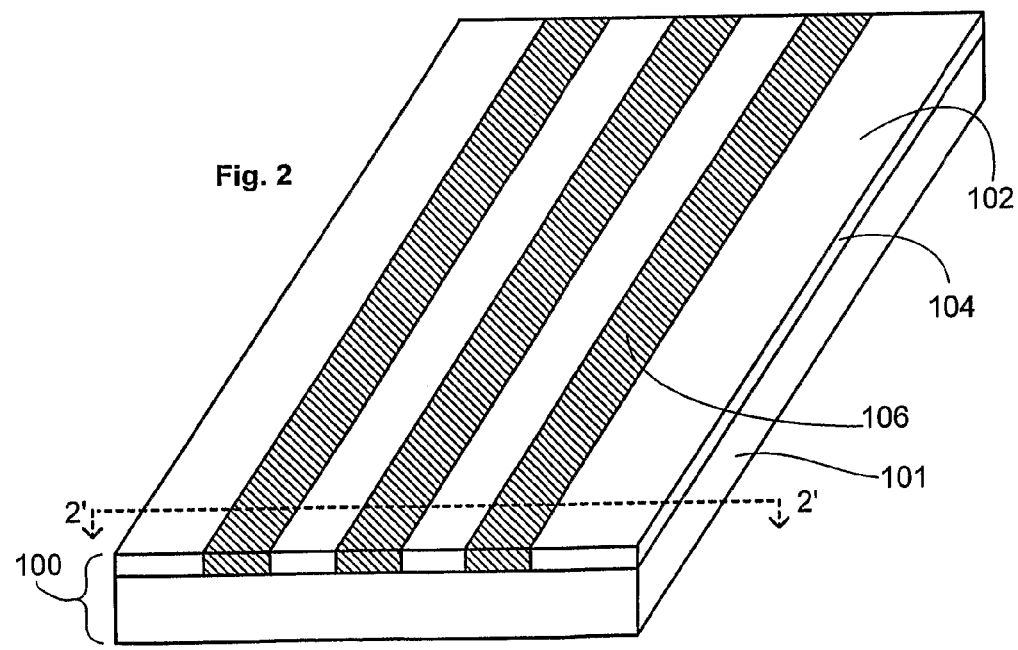
FIG. 2 is a perspective view, and FIG. 2' is a cross-sectional view, both depicting the release liner of FIG. 1 following a step of embedding the non-adhesive material, in accordance with an embodiment of the present invention.
Figure 2:
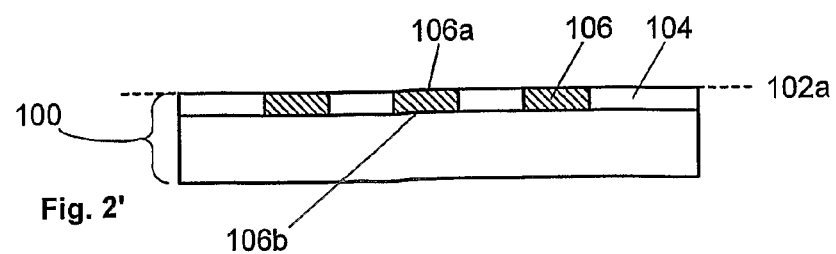

FIGS. 1, 2, 2', 3, 3', 3" and 4-7 are perspective and cross sectional views depicting a process of a first embodiment of making an adhesive article of the invention. FIG. 1 is a perspective view of a release liner 100 containing a first pattern 106 having an upper or second surface 106a and a lower or first surface 106b which is in contact with the release surface 102. The release liner 100 includes a release surface 102, molding layer 104 and substrate 101. A first pattern 106 of a first non-adhesive material has been applied to the release surface 102. In the embodiment shown in FIG. 1, the first pattern 106 has been applied in a direction substantially parallel with the sides of the release liner, as represented by the arrow 108. It should be understood that the first pattern 106 in this and other embodiments described herein and illustrated in the figures, may be applied at an angle, such as about 22.5°, about 30°, about 45°, about 60°, about 75°, about 90° or about any other selected angle relative to the direction defined by the arrow 108. Thus, overlapping patterns may form shapes such as squares or diamonds when the release liner is viewed in a plan view. In combination with the angles relative to the direction indicated by arrow 108 at which the first pattern 106 is applied, both patterns may be applied at any selected angle with the exception of a parallel, exactly overlapping identical pattern, in which case, the effect would be to deposit only one pattern. The release liner 100 may be any suitable release liner having a molding layer 104 into which a pattern of non-adhesive material, such as the pattern 106, may be embedded, as described below.

Following application of the first pattern 106, the first pattern 106 is embedded into the release surface 102 and molding layer 104 as shown in FIG. 2. Suitable methods for embedding are described below.

FIG. 2 is a perspective view of the release liner 100, after the first pattern 106 of the first non-adhesive material has been embedded into the release surface 102 and the molding layer 104. FIG. 2' is a cross-sectional view taken at line 2'-2' of FIG. 2. In the embodiment shown in FIGS. 2 and 2', the first pattern 106 is embedded into the molding layer 104 to a level such that the second surface 106a of the first pattern 106 (hereinafter generally referred to as the second surface 106a of the first pattern 106) is substantially coplanar with the upper surface of the release liner 100. That is the second surface 106a of the first pattern 106 is substantially coplanar with a plane 102a defined by the release surface 102 (see FIG. 2'). In other embodiments (not shown), the first pattern 106 may be embedded to a depth whereby the second surface 106a of the first pattern 106 is either above or below the plane defined by the release surface 102. In these latter embodiments, the first pattern 106 either is only partially embedded, in which a portion of the first pattern 106 extends above the plane 102a, or is over-embedded, in which the second surface of the first pattern 106 is below the plane 102a.

Figure 3:
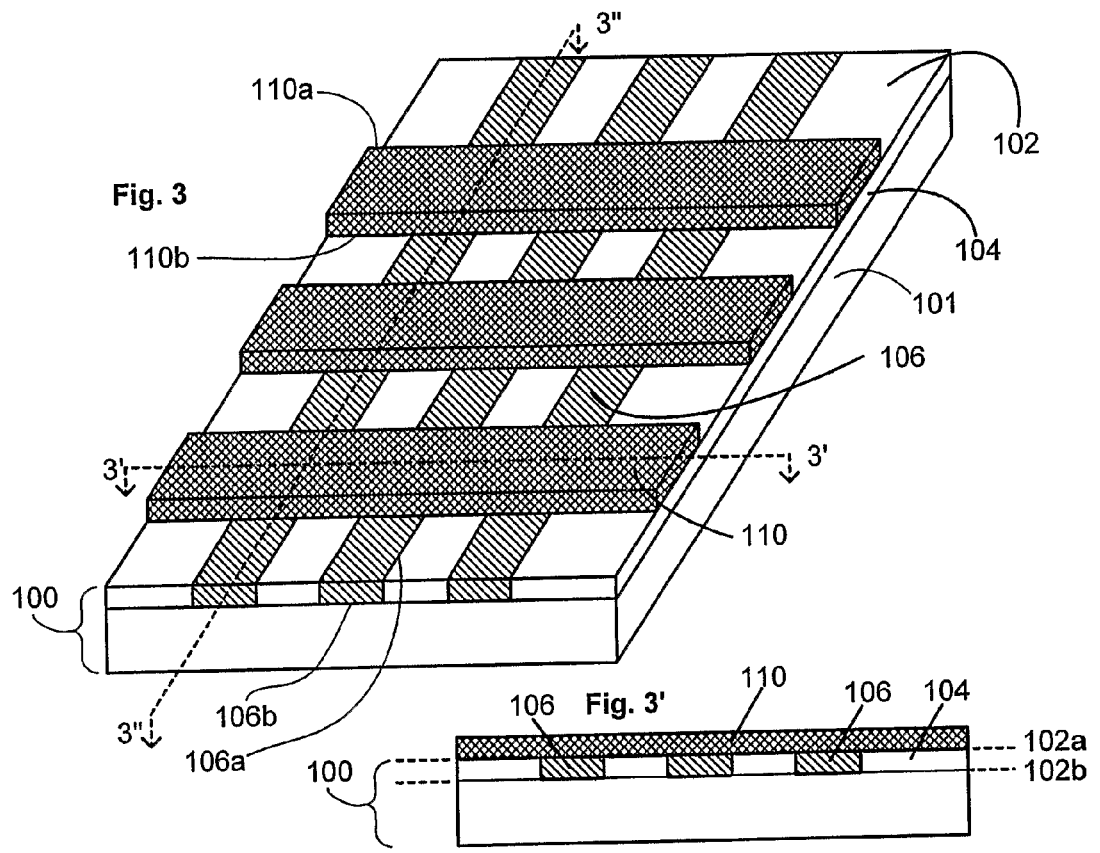
FIGS. 3, 3', 3" and 4-7 are perspective and cross sectional views depicting steps of a first embodiment of making an adhesive article including a release liner with a first pattern and a second pattern of a non-adhesive material on the release surface.
Figure 3:
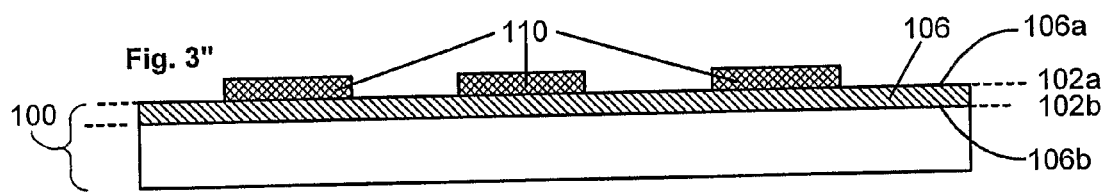

FIGS. 3, 3' and 3" depict the release liner 100 after a second pattern 110 of a second non-adhesive material is applied onto the release surface 102 of the release liner 100 and at least a portion of the second pattern 110 overlaps the first pattern 106. One surface of the pattern 110 (first surface) identified as 110b, is in contact with the release surface 102 and the first surface 106a of the first pattern 106, and the opposite surface (second surface) 110a of pattern 110 is exposed. FIG. 3' is a cross-sectional view taken at line 3'-3' of FIG. 3, and FIG. 3" is a cross-sectional view taken at line 3"-3" of FIG. 3. As shown in FIGS. 3' and 3", a plane 102a is defined by the release surface 102. This plane 102a is referred to herein in defining the degree to which the respective non-adhesive materials are embedded into the release liner 100. In this embodiment, the second pattern 110 is not embedded into the release liner 100, although in other embodiments it could be fully or partially embedded (see below). As depicted in FIG. 3', a first portion of the second pattern is applied onto the release surface 102 of the release liner 100, and a second portion is applied onto the upper surface of the embedded first pattern 106 where the patterns overlap. In this embodiment, in which the upper or second surface 106a of the embedded first pattern 106 is substantially coplanar with the plane 102a defined by the release surface 102, the second pattern 110 forms a strip having a substantially straight, flat bottom or first surface 110b. In FIGS. 3, 3' and 3" the first surfaces 106b of the pattern 106 embedded in the molding layer 104 define a second plane 102b which is illustrated in these figures as substantially parallel to plane 102a. Alternatively, the plane 102b may not be parallel to plane 102a and/or the first surfaces 106b may form more than one plane which are different from plane 102a.

In embodiments in which the embedded first pattern 106 extends below or above the plane 102a defined by the release surface 102 (not shown), the second pattern 110 may be formed having a stepped appearance (see FIG. 8, which has such a stepped appearance). In other embodiments, the upper surface of the second pattern 110 may be substantially straight and flat as shown in FIGS. 3' and 3", forming a single plane parallel to the plane 102a, without sagging into or forming a stepped ridge over the portion of the embedded first pattern 106 which is below the plane 102a.

FIG. 3" is a cross-sectional view taken at line 3"-3" of FIG. 3. The first pattern 106 appears as a continuous structure, the upper or second surface 106a of which is coplanar with the plane 102a defined by the release surface 102, and the first surfaces 106b define a second plane 102b as described above. The three illustrated lines of the second pattern 110 in FIG. 3 appear as three separate structures above the plane 102a.

Figure 4:
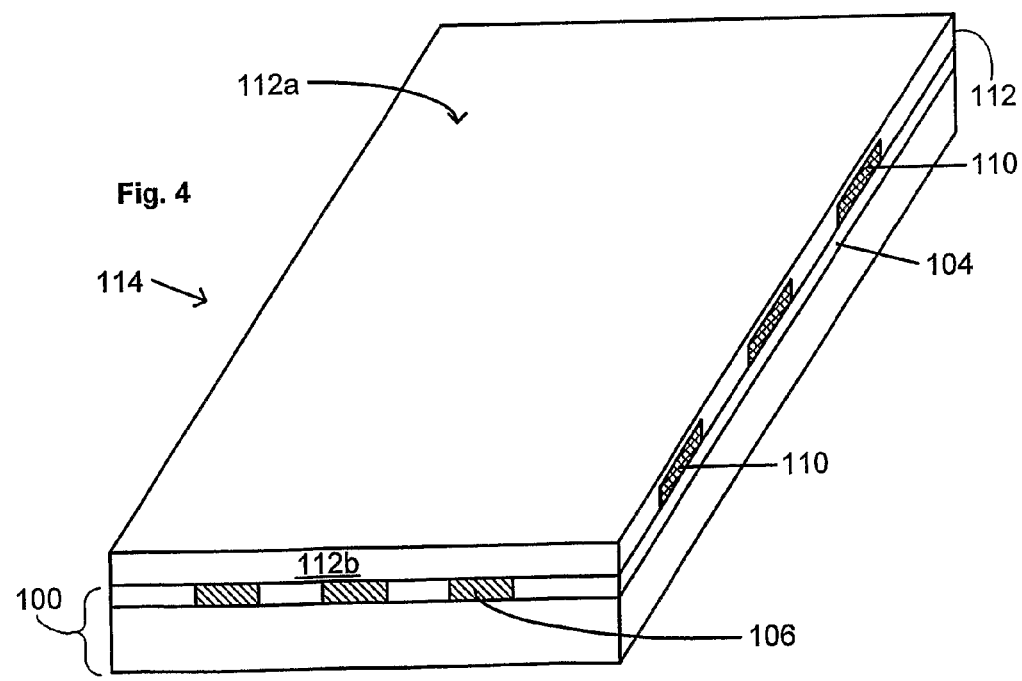

Following application of the second pattern 110, an adhesive layer 112 is applied onto the release surface of release liner 100, thus forming an adhesive article 114 illustrated in FIG. 4. The adhesive layer 112 includes a first surface 112c (facing downward, not shown in FIG. 4), a second surface 112a and end edges 112b. The first surface of the adhesive layer is adhered to the release surface 102 of the release liner 100 and to the exposed second surfaces of the two patterns. The second surface 112a is exposed on the upper surface of the adhesive article 114 shown in FIG. 4.

Figure 5:
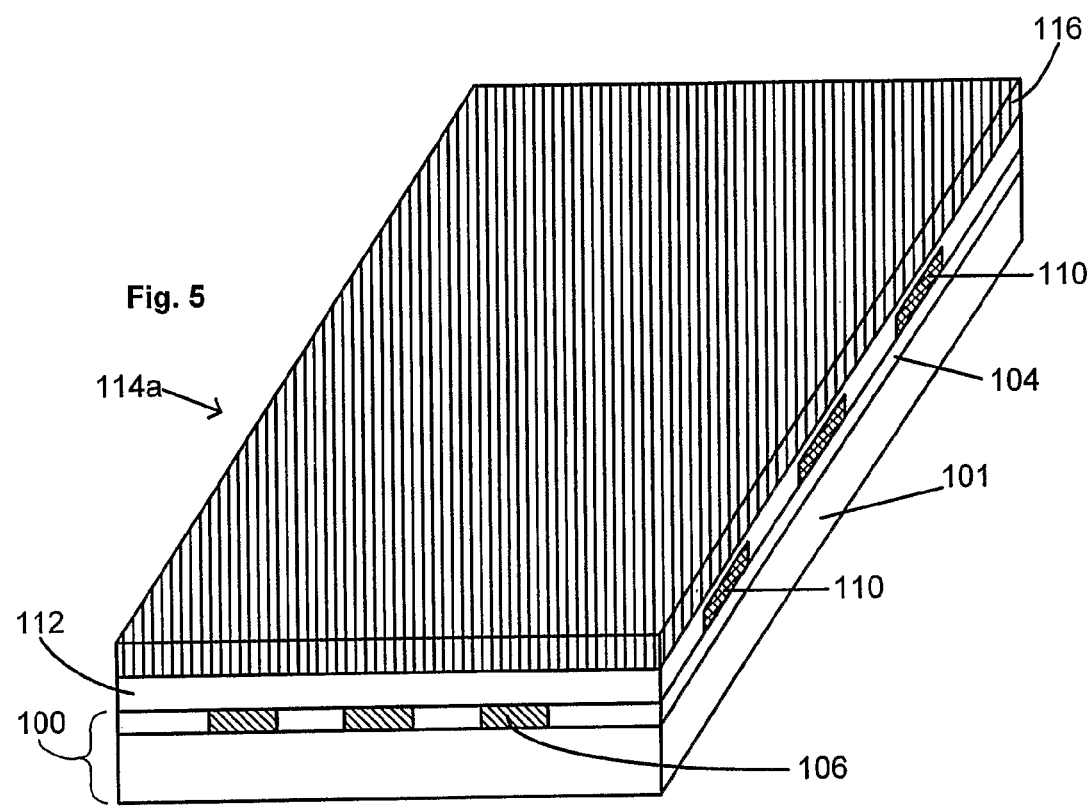

In one embodiment, shown in FIG. 5, a facestock 116 is applied to the second surface 112a of the adhesive article 114 to form adhesive article 114*a*. The facestock 116 may be any of the facestocks described above including paper or a polymeric film such as a vinyl (PVC) or polyester film. The facestock 116 is selected for the desired properties needed by the adhesive article 114*a*. For instance, if the adhesive article 114*a* is to be applied to a vehicle, then a vinyl facestock is generally selected for its flexibility and durability. A polyurethane facestock may also be used for applications which are exposed to weathering. The facestock 116, although shown in FIG. 5 as a single layer, can comprise multiple layers with the layers selected for weatherability, printability, etc. The facestock 116 is in adhesive contact with the adhesive layer 112, which may be, for example, a pressure-sensitive adhesive. The adhesive 112 is in adhesive contact with the release surface 102 and the exposed second surfaces of the non-adhesive materials of the first pattern 106 and the second pattern 110. As can be seen in FIG. 5, the second pattern 110 is embedded into the adhesive layer. When the release liner 100 is removed from adhesive article 114*a*, the non-adhesive material of the first pattern 106 and the second pattern 110 remain adhered to the adhesive layer 112. It is understood that one or more of the non-adhesive materials may extend partially into the adhesive layer but a portion, in one embodiment a major portion, of at least one of the non-adhesive materials (pattern 106) extends beyond or protrudes from the surface of the adhesive layer.

Figure 6:
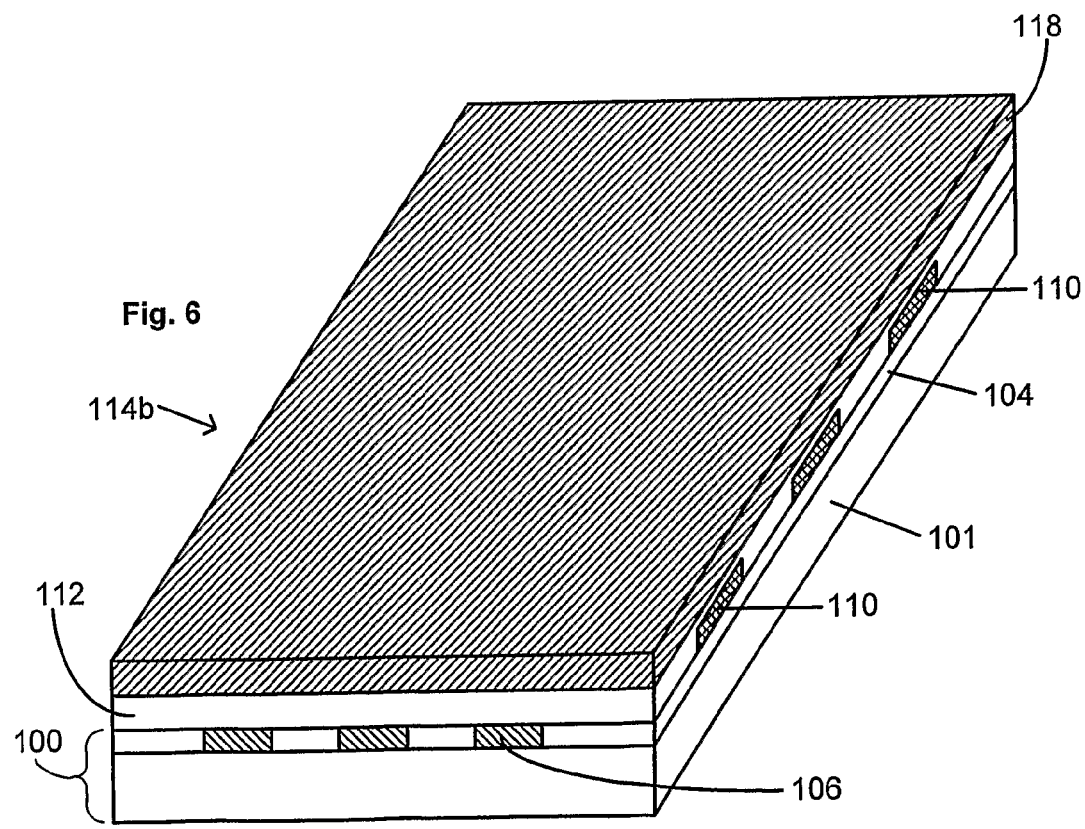

In another embodiment, shown in FIG. 6, the adhesive article 114*b* includes a second release liner 118, instead of the facestock 116 shown in FIG. 5, applied to the second surface 112*a* of the adhesive layer 112. The release liner 118 may be a release-treated paper or polymeric film such as a vinyl (PVC) or polyester film. In other embodiments, the release liner 118 may be the same as any of the materials disclosed herein for use as a release liner such as for the release liner 100. In the embodiment shown in FIG. 6, when both release liners 100 and 118 are removed, a double-sided adhesive article is provided.

In one embodiment, the release liner 100 may have a texture formed on its release surface 102. The release liner is thereby a textured-finish release liner, as defined herein. The textured surface may be patterned, or the textured surface may have a matte finish. In one embodiment, the matte finish is a substantially random pattern. This texture may be imparted to the adhesive and non-adhesive materials using the textured-finish release liner.

Other embodiments of adhesive articles and methods of the invention may be obtained by adding, singly or in combination, additional layers of non-adhesive forms, adhesive, release coatings, release liners, and facestocks. A few of the many examples of such adhesive article constructions are described herein.

The release liners used in the methods and adhesive articles of the invention can have molding and release layers on both the first and second surfaces of a base or carrier layer allowing for the fabrication of transfer adhesives and double faced adhesive articles with the attributes of the invention on both of the adhesive surfaces.

A self wound transfer adhesive can be obtained from the adhesive article of the invention illustrated above in FIG. 4 by (a) applying a release coating to the second surface of the release liner 100 or using a first release liner 100 in which the second surface is a release surface, and (b) winding the adhesive article into a roll. The release characteristics of the liner are such that the adhesive only adheres to one side of the liner when unwound.

A single liner double faced adhesive tape can be obtained from the adhesive article illustrated in FIG. 5 by (a) applying a release coating to the second surface of the release liner 100 or using a first release liner 100 in which the second surface is a release surface, and (b) applying a second adhesive layer (not shown) having a first surface and a second surface onto the release surface wherein the first surface of the second adhesive layer is in contact with the release surface of release liner 100. When this article is wound the exposed adhesive adheres to the exposed surface of the facestock. The release characteristics of the liner are such that one of the adhesives adheres to one side of the liner when unwound producing a face stock with adhesive on both sides and a liner adhered to one of the adhesive surfaces.

Figure 7:
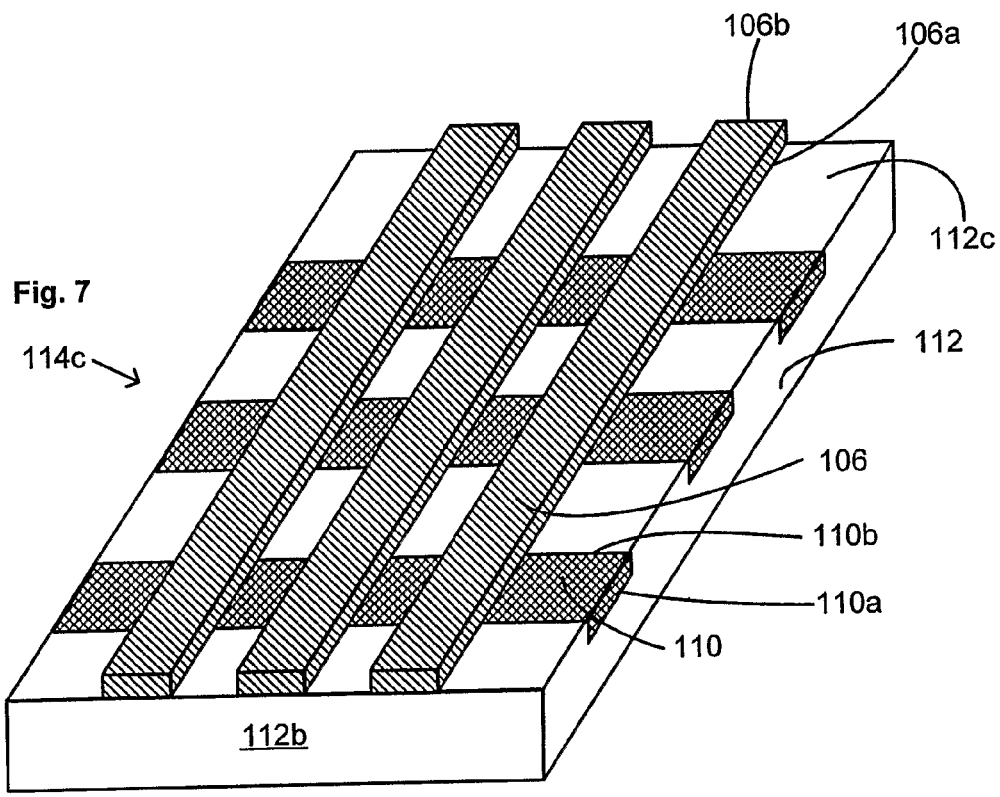

FIG. 7 is a perspective view of the adhesive article 114 of the first embodiment shown in FIG. 4, following removal of the release liner 100, with the article turned over so that the adhesive layer 112 is on the lower side of the article depicted in FIG. 7. As shown in FIG. 7, the adhesive article 114*c* in this embodiment includes the second pattern 110 embedded in the adhesive, and the first pattern 106 substantially on the surface of the adhesive layer 112. Since the patterns 110 and 106, which were formed by application of the non-adhesive materials to the release liner have been transferred to the adhesive layer 112, the patterns are in reverse position in or on the adhesive layer 112 relative to the position the patterns were placed in or on the release liner 100. As shown in FIG. 7, the adhesive article 114*c*, following removal of the release liner 100, has a continuous layer of adhesive 112 having a first surface 112*c* and a back or second surface 112*a* (not shown) and end edges 112*b*; a first pattern 106 of first non-adhesive material forms having a first exposed surface 106*b* and an opposed surface 106*a* in contact with the first surface 112*c* of the adhesive layer 112 and overlapping surface 110*b* of the second pattern 110; and a second pattern 110 of second non-adhesive material forms having a partially exposed second surface 110*b* which is partially in contact with the first surface 106*a* of pattern 106 where the two patterns overlap, and an opposed first 110*a* surface embedded in the adhesive layer 112. The first pattern 106 which was embedded in the release surface of the release liner now on the surface of the adhesive layer 112. As shown, each of the first surfaces 106*b* and 110*b* of patterns 106 and 110 of non-adhesive material forms is in a different plane, and the first pattern 106 is in contact with the first surface 112*c* of the adhesive layer 112 and protrudes from the adhesive layer 112. The plane formed the first surfaces 106*b* corresponds to plane 102*b*, and the plane formed by the first surfaces 110*b* corresponds to plane 102*a* as illustrated in and discussed in reference to FIGS. 3, 3' and 3". The combination of a non-adhesive pattern 110 in the adhesive and a second non-adhesive pattern protruding from the same side of the adhesive layer provides air egress, repositionability and slideability.

Figure 8:
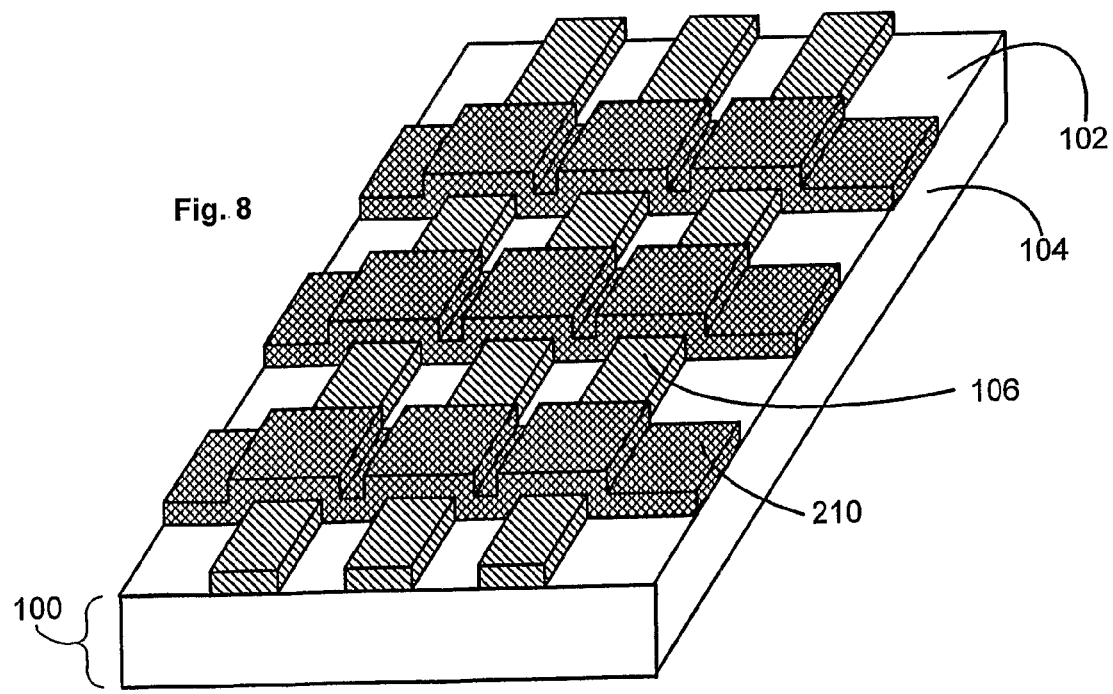

A second embodiment of the method of the invention is illustrated in FIGS. 1, 8, 9, 9', 9", 9''', 10 and 11. The method of the second embodiment comprises (a) providing a release liner comprising a molding layer having a release surface and a second surface; (b) applying a first pattern of a first non-adhesive material to a first portion of the release surface; (c) applying a second pattern of a second non-adhesive material to a second portion of the release surface, wherein the second pattern partially overlaps the first pattern; (d) embedding at least one of the first and second non-adhesive materials into the molding layer; and (e) applying an adhesive layer having a first and second surface and end edges onto the release liner, wherein the front surface of the adhesive layer is adhered to the release surface of the release liner. In this embodiment, the first pattern initially is not embedded in the molding layer of the release liner. Rather the second pattern is applied over the first pattern, portions or all of one or both patterns are embedded in the molding layer, and the part of the first pattern overlapped by the second pattern is embedded more deeply into the release liner than the non-overlapped portions of the first pattern.

FIGS. 1, 8, 9, 9', 9", 9"', 10 and 11 are perspective and cross sectional views depicting the second embodiment of making the adhesive article outlined above. FIG. 1 is a perspective view of the release liner 100 on pattern 106, as described above. The release liner 100 includes the release surface 102, and the molding layer 104. The first pattern 106 of a first non-adhesive material has been applied to the release surface 102. In this second embodiment, the first pattern 106 is not embedded into the release liner prior to application of a second pattern 210. In the subsequent figures, for the sake of simplicity, the molding layer 104 is not shown as a separate layer; however, since it is to be understood that the release liner 100 includes the moldable layer 104, either as a separate layer, or as the material of which the release liner 100 itself is formed, the entire layer is referred to by reference numeral 104 to indicate that at least a part of the release liner 100 is a molding layer 104.

FIG. 8 is a perspective view of the release liner 100 (molding layer 104), after applying the second pattern 210 of a second non-adhesive material over the first pattern. The second pattern 210 is applied in a stepped pattern in this embodiment. In other embodiments (not shown), depending on the rheology and method of application of the non-adhesive material, the second pattern may be applied in a non-stepped form, that is, with some bridging between the surface of the release liner 100 and the profile of the first pattern 106. In yet other embodiments (not shown), again depending on the rheology and method of application of the non-adhesive material, the second pattern may be applied so that it steps over the first pattern 106, that is, does not bridge, and at the same time results in the formation of the second pattern 210 having a substantially planar upper surface between the areas of overlap, i.e., without the gaps between the crossover points.

FIGS. 9, 9', 9" and 9"' depict the release liner 100 after both the first pattern 106 and the second pattern 210 are embedded into the release surface 102 and molding layer 104 of the release liner 100. FIG. 9' is a cross-sectional view taken at line 9'-9' of FIG. 9, FIG. 9" is a cross-sectional view taken at line 9"-9" of FIG. 9, and FIG. 9"' is a cross-sectional view taken at line 9"'-9"' of FIG. 9. In this second embodiment, both the first pattern 106 and the second pattern 210 are embedded into the molding layer 104 and the release surface 102. At the points of overlap, portions of the first pattern 106 are more deeply embedded into the release surface 102, as shown in FIGS. 9' and 9"'. As shown in FIG. 9, the exposed upper or second surfaces of both patterns (106a and 210a, respectively) are substantially level or flush with the release surface 102. In this embodiment, the first pattern 106 is at two levels relative to the plane 102a defined by the release surface 102 of the release liner 100. A first portion 106' remains substantially flush with the surface plane 102a FIG. 9", while a second portion 106" is more deeply embedded into the surface, and is actually below the overlapping portion of the second pattern 210. In the embodiment shown in FIG. 9, the upper or second surface 210a of the embedded portion of the first pattern 210 is substantially coplanar with the plane defined by the release surface 102, while the upper or second surface 106a of the portion 106" of the first pattern 106 which is overlapped by the second pattern 210 is below the lower or first surface 210b of the second pattern 210. In other embodiments, either or both patterns may be incompletely embedded into the release surface 102 of the release liner. In such other embodiments, the upper surface of a portion of the first pattern 106 is still below the lower surface of the overlapping portion of the second pattern 210. Thus, in this second embodiment, at least one of the patterns of non-adhesive material is at least partially overlapped by another pattern, and the overlapped portion is embedded more deeply into the molding layer 104 than other parts are embedded.

FIG. 9' is a cross-sectional view of the release liner 100 taken at line 9'-9' of FIG. 9. As shown in FIG. 9' (and in FIGS. 9" and 9"'), a plane 102a is defined by the release surface 102. This plane 102a is referred to herein in defining the degree to which the respective non-adhesive materials are embedded into the release liner 100. As depicted in FIG. 9', the second surface 210a of the second pattern 210 remains coplanar with the plane 102a defined by the release surface 102 of the release liner 100, and a portion 106" of the first pattern 106 is embedded more deeply into the release surface 102.

Since both patterns 106 and 210 are embedded into the molding layer 104, the second surface 210a of second pattern 210 is in the same plane 102a as the surface of the molding layer 104. The first surface 210b is in a second plane identified in FIG. 9' as plane 102b. A portion of second pattern 106 shown as 106" is below pattern 210, and the lower or first surface of 106" is in another plane identified as 102c.

In other embodiments (not shown), the second pattern 210 may be embedded to a depth whereby the upper or second surface 210a of the second pattern 210 is either above or below the plane 102a. In these latter embodiments, the second pattern 210 either is only partially embedded, in which a portion of the second pattern 210 extends above the plane 102a, or is over-embedded, in which the surface 210a of the second pattern is below the plane 102a. Similarly, in other embodiments, the first pattern 106 may be over- or under-embedded. In such embodiments, the resulting surface of the release liner 100 may have 2 or more different levels, thus providing a wide range of possible combinations of initial tack, final tack, air egress, slideability and repositionability when the adhesive layer is subsequently applied. In any of these variations, the overlapped portion of the first pattern 106 is below the remainder of the first pattern 106.

As shown in FIG. 9", which is a cross-sectional view taken at line 9"-9" of FIG. 9, in some areas of the release liner, the first pattern 106 is embedded to a level at which its second surface 106a is exposed and substantially coplanar with the plane 102a, and the surface is not overlapped by the second pattern 210 in these areas.

FIG. 9"' is a cross-sectional view taken at line 9"'-9"' of FIG. 9. In this cross-sectional view, the second pattern 210 appears as a three separate pieces, corresponding to the strips shown in FIG. 9, and the first pattern 106 appears as a stepped structure (106' and 106"). In this embodiment, in which the upper surface 210a of the embedded second pattern 210 is substantially coplanar with the plane 102a, the first pattern 106 forms a strip having a stepped appearance at the locations of overlap by the second pattern, which is illustrated in FIG. 9"'. Thus, as shown by comparing FIGS. 9' and 9", and by viewing FIG. 9"', the first pattern 106 is embedded to at least two different depths into the layer 104. A portion 106" of the second surface 106a of pattern 106 is in plane 102a, and second surface 106a of another portion 106" is in plane 102b. In addition, a portion of the first surface 106b of 106" is in plane 102b and another portion of the first surface of 106b is in plane 102c.

Figure 10:
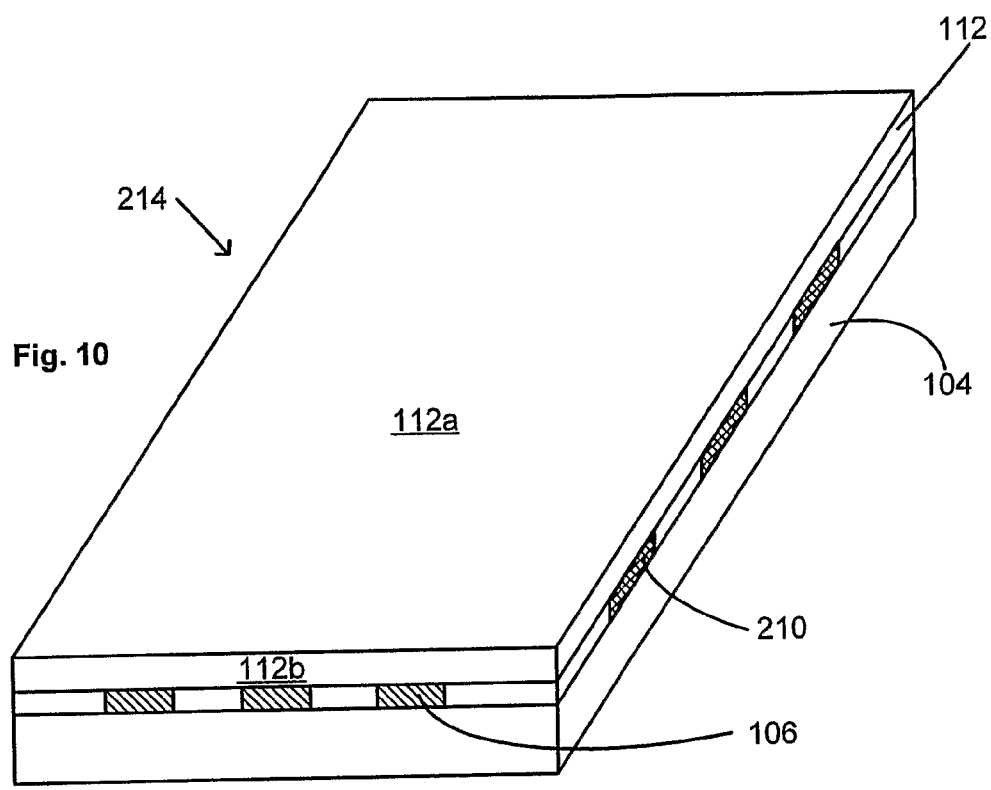

Following application of the second pattern 210 and embedding of both the first pattern 106 and the second pattern 210, an adhesive layer 112 is transferred onto the release surfaces 102a, release liner 100, thus forming an adhesive article 214, as shown in FIG. 10. The adhesive layer 112 includes a first surface 112c (facing downward, not shown in FIG. 10), a second surface 112a and end edges 112b. The first surface 112c of the adhesive layer is adhered to the release surface 102 of the release liner 100 and the second surfaces 106a and 210a of the two patterns. The second surface 112a is exposed on the upper surface of the adhesive article 214 shown in FIG. 10.

Figure 11:
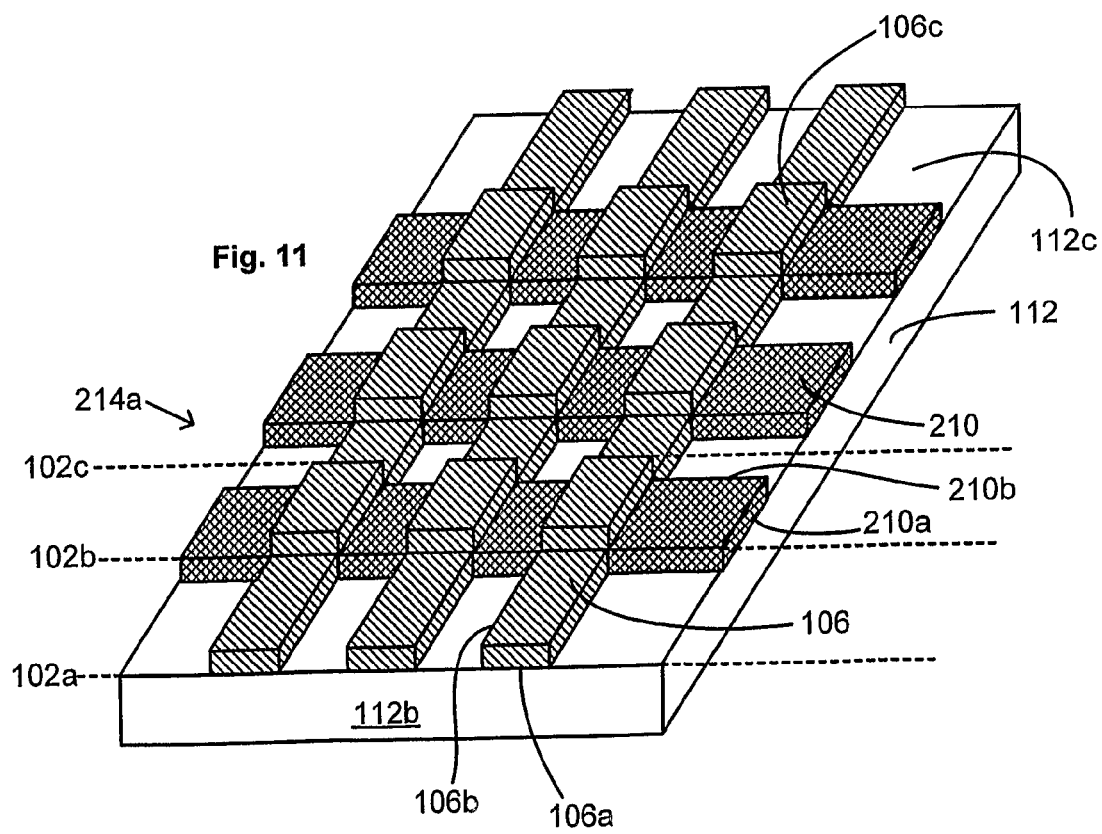

FIG. 11 is a perspective view of the adhesive article 214 of the second embodiment shown in FIG. 10, following removal of the release liner 100, with the article turned over so that the adhesive layer 112 is on the lower side of the article depicted in FIG. 11. Since the patterns 210 and 106, formed by application of the non-adhesive materials to the release liner, in which the both patterns are embedded in the release liner 100, are transferred to the adhesive layer 112, the patterns are in reverse position on the adhesive layer 112 relative to the position in the release liner 100. As shown in FIG. 11, the adhesive article 214a includes: adhesive layer 112; the second pattern 210 and the partially overlapping first pattern 106 above the adhesive layer 112 and in contact with the first surface 112c of the adhesive layer 112; and portions 106c of the first pattern 106 extending above the first surface of pattern 210 at the overlap. As shown, each of the patterns 106 and 210 of non-adhesive material forms has a first surface 106b and 210b, respectively, and the first surface of the first pattern 106 is at two different heights (planes 102b and 102c) relative to first surface 112c (plane 102a), one of which is higher than the first surface 210b of the second pattern 210 (plane 102b). The different heights provide protrusions of non-adhesive material which comprise air egress, repositionability and slideability. Stated in the alternative, the first surfaces 210b of the second pattern 210 are in plane 102b; the first surfaces 106b of the first pattern 106 are in planes 102b and 102c; and the planes of the first surfaces 106b and 210b are different from the plane 102a of the first adhesive surface 112c.

In one embodiment, not shown with this second embodiment but substantially similar to the structure shown in FIG. 5 with respect to the first embodiment, a facestock is applied to the second surface 112a of the adhesive article 214. In one embodiment, not shown with this embodiment but substantially similar to the structure shown in FIG. 6 with respect to the first embodiment, an additional release liner is applied to the back surface 112a of the adhesive article 214.

FIGS. 1, 2, 12a, 12b, 13, 13', 13" and 14 are perspective and cross sectional views depicting a third embodiment of making an adhesive articles of the invention. FIGS. 1 and 2 are perspective views of a release liner 100 or a first pattern of non-adhesive material from 106, as described above. In this third embodiment, the first pattern 106 is embedded into the release liner 100 prior to subsequent steps, as shown in FIGS. 2 and 2'. However subsequent steps differ in this embodiment, thus the adhesive article is identified by the reference numeral 314, in accordance with the differences between this embodiment and the first and second embodiments.

In this third embodiment, rather than applying a second pattern over the embedded first pattern 106, as in the first embodiment, the embedded first pattern 106 is removed prior to application of a second pattern 310. The sequential steps of embedding the first pattern 106, followed by removal of the first pattern 106, shown in FIGS. 12a and 12b, results in the formation of a negative or void, or channeling pattern 122 in the release liner 100, as shown in FIGS. 12b and 13. As in previous FIGS. 8-10, molding layer 104 is used to represent the release liner 100.

FIGS. 12a and 12b are cross-sectional views of the release liner 100 similar to FIG. 2', except that in FIG. 12a, an adhesive layer 120 has been applied to the release surface 102. The adhesive used in the adhesive layer 120 is selected to provide stronger adhesion to the non-adhesive material forming the first pattern 106 than the adhesion of the non-adhesive material has to the release surface 102 of molding layer 104. As shown in FIG. 12b, when the adhesive layer 120 is removed, the non-adhesive material forming the first pattern 106 is removed with the adhesive layer 120, thus forming the voids or channels 122 in the molding layer 104.

In an alternative embodiment to using the sequential steps of applying a first pattern of non-conductive material forms to the surface of molding layer, embedding the first pattern, and removing the first pattern to form voids or channels as shown in FIG. 12a, 12b and 13, the molding layer 300 of FIG. 13 may be prepared by directly embossing the first pattern into the surface 102 of molding layer 104. Any of the embossing procedures known in the art may be utilized to provide the desired first pattern. For example, the first pattern may be obtained by applying heat and pressure to the surface of a molding layer using a roller or platen having the desired pattern in or on its surface.

In other embodiments, the non-adhesive material may be removed by other means, depending on the material of which the non-adhesive material is formed. For example, the non-adhesive material may be removed by dissolution with an appropriate solvent, or by an electrolytic method, or by a physical method. In most cases, the use of adhesive as described above is suitable.

FIG. 13 is a perspective view of molding layer 104, following the removal of the first pattern of non-adhesive material forms 106. As shown in FIG. 13, removal of the first pattern 106 leaves voids or channels 122 remaining in the surface of the molding layer 104 in a pattern substantially corresponding to the first pattern 106. As will be understood, in this embodiment, in which the first pattern 106 constitutes lines, when the non-adhesive material of the first pattern 106 is removed, the void or channel pattern 122 is substantially in the form of similar lines. In other embodiments, for example where the first pattern 106 includes a line of dots, "dashes" or elongated forms separated by regions free of the non-adhesive material, a corresponding similar pattern will be formed when the non-adhesive material is removed.

Figure 14:
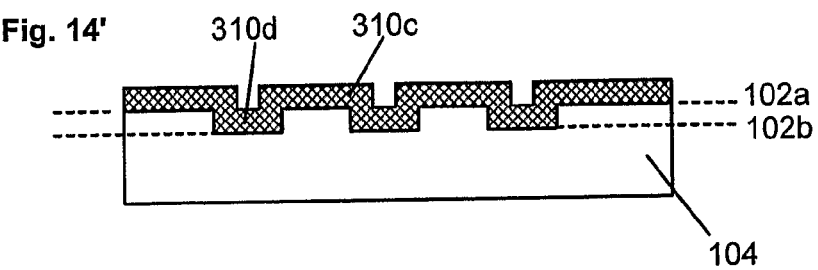

Referring now to FIGS. 14, 14' and 14", a second non-adhesive material is applied to the molding layer 104 to form a second pattern 310 having a second surface 310a and a first surface 310b. The second pattern 310 is applied in a stepped pattern in this embodiment. In other embodiments (not shown), depending on the rheology and method of application of the non-adhesive material, the second pattern may be applied in a non-stepped form, that is, with some bridging between the surface of the molding layer 104 and the profile of the channel 122. In yet other embodiments (not shown), again depending on the rheology and method of application of the non-adhesive material, the second pattern 310 may be applied so that it steps into the channel 122, that is, does not bridge, and at the same time results in the formation of the second pattern 310 having a substantially planar upper surface, i.e., without the gaps between the crossover points.

FIG. 14' is a cross-sectional view taken at line 14'-14' of FIG. 14 and FIG. 14" is a cross-sectional view taken at line 14"-14" of FIG. 14. In this third embodiment, some portions 310d of the second pattern 310 are embedded in the channels 122 in molding layer 104, and some portions 310c are on the original release surface 102, as shown in FIG. 14. It is noted that the portions 310d have not actually been directly embedded as in the first two embodiments. The embedded portions 310d of the second pattern 310 are considered to be embedded because when they are applied into the void or channel 122 left by removal of the first pattern 106, and the portions 310d are effectively in an embedded position relative to the plane 102a of the release surface 102 of molding layer 104. Thus, in this embodiment, the second pattern 310 comprises elements 310c and 310d at two levels relative to the plane 102a. A first portion 310c remains above the plane 102a, i.e., not embedded, while a second portion 310d is embedded into the surface below the plane 102a. In the embodiment shown in FIG. 14', the upper or second surface of the embedded portion 310d of the second pattern 310 is substantially coplanar with the plane 102a defined by the release surface 102. In other embodiments, the second 310d portion may be incompletely embedded into the release surface 102 of the release liner, such that the upper surface of the portion 310d is above the level of the plane 102a. In another embodiment, in which the first pattern 106 is over-embedded prior to its removal, the upper surface of the portion 310d may be below the plane 102a. In this embodiment, the portion 310d is substantially at or above the level defined by the plane 102a, since it is applied directly onto the original release surface 102.

As shown in FIG. 14", which is a cross-sectional view taken at line 14"-14" of FIG. 14, in some areas of the release liner, the second pattern 310 is embedded, or fills the channel 122 such that the upper surface of the portion 310c is substantially coplanar with the plane 102a, as a result of its being deposited on the bottom of the channel 122. In other embodiments, the second pattern 310 may be applied using a non-adhesive material having a suitable rheology which allows the non-adhesive material to fill the channel 122 while at the same time filling the gaps between the portions 310c formed by the step-like application of the pattern 310.

Figure 15:
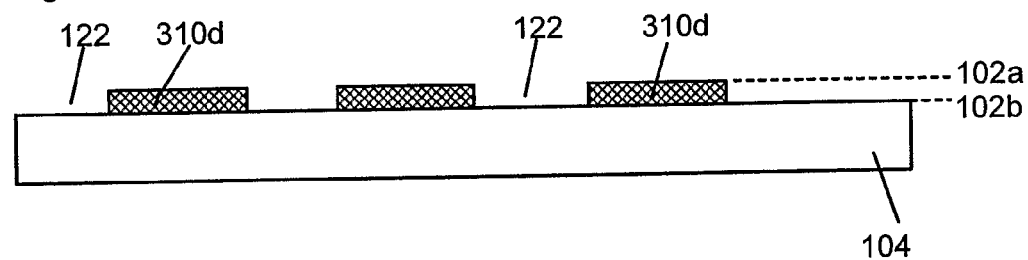
Figure 15:
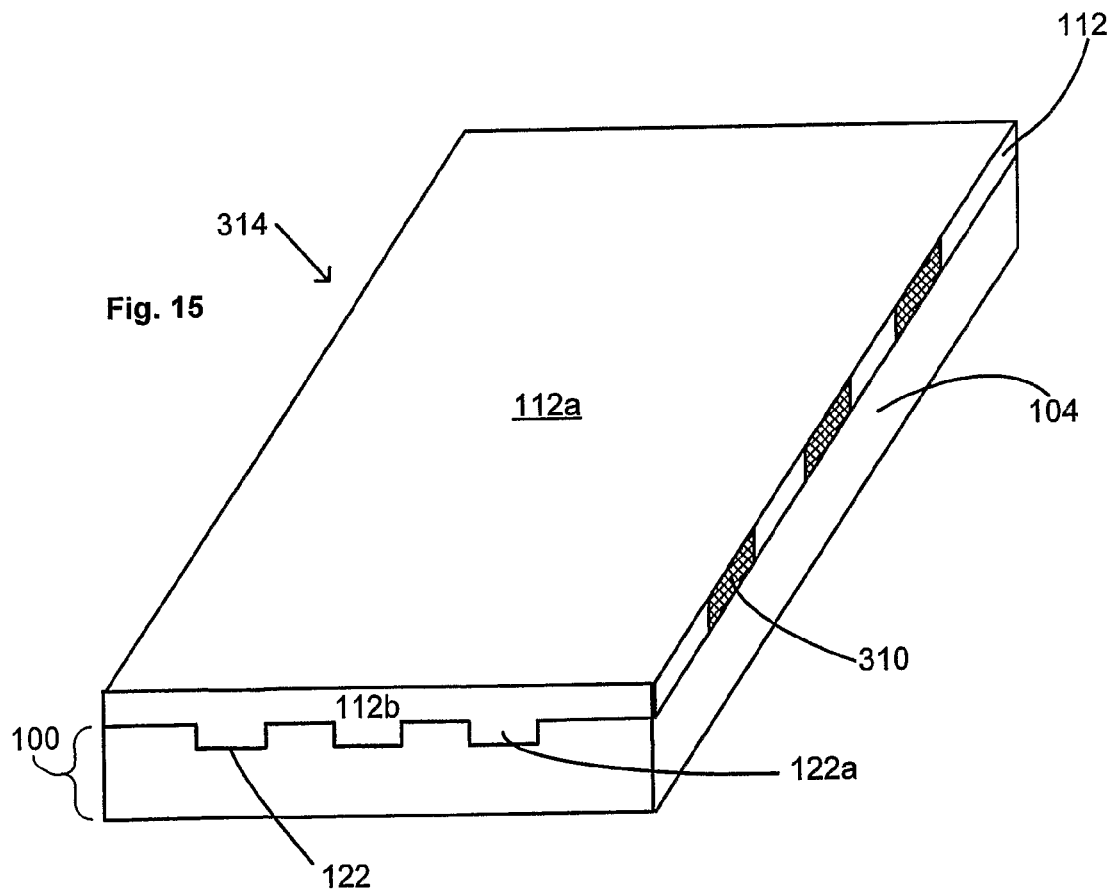

Following application of the second pattern 310, as shown in FIG. 14, an adhesive layer 112 is applied over the molding layer 104 and second pattern 310, thus forming an adhesive article 314, as shown in FIG. 15. The adhesive layer 112 includes a first surface 112c (facing downward, not shown in FIG. 15), a second surface 112a and end edges 112b. The first surface 112c of the adhesive layer is adhered to the release surface 102 of the release liner 100 and the exposed surface of the second pattern. The second surface 112a is exposed on the upper surface of the adhesive article 314 shown in FIG. 15.

The adhesive structure 314 shown in FIG. 15 (and with additional reference to FIGS. 14, 14' and 14") includes a release liner 100 having a molding layer 104; a continuous layer of adhesive 112 having a front surface 112c (not shown), a back surface 112a and end edges 112b, in which the front surface 112a of the adhesive 112 is adhered to the release surface 102 of molding layer 104, the first embossed pattern 122 and the second pattern 310. A portion 310d of the second pattern 310 is at least partially embedded in portions of the first embossed pattern 122.

Figure 16:
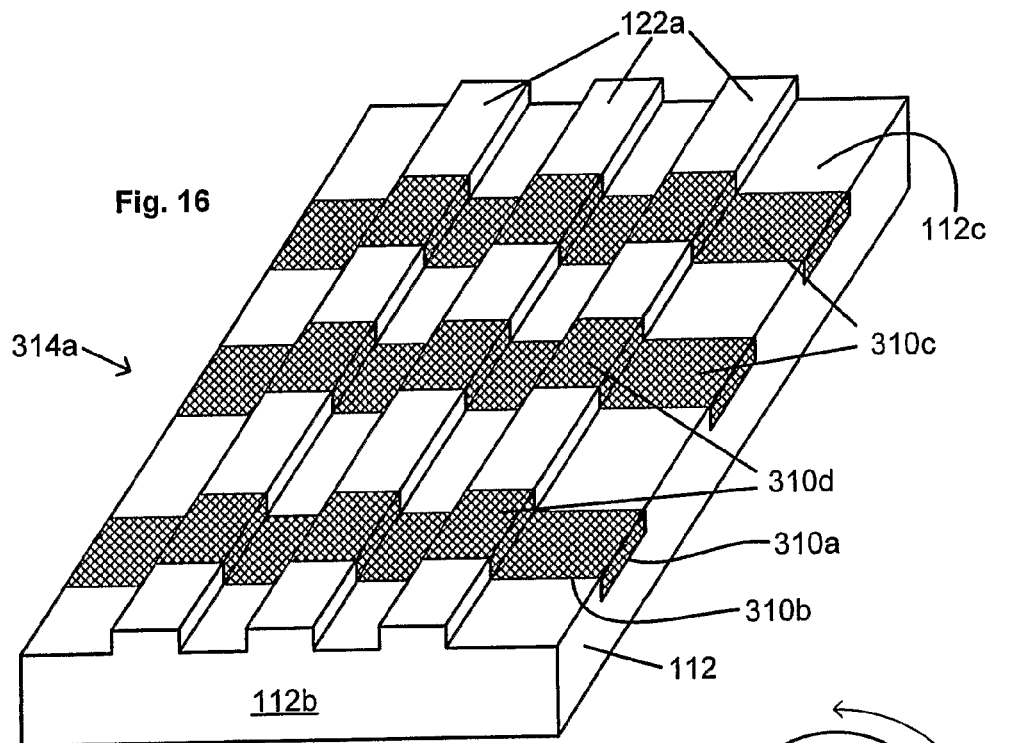

FIG. 16 is a perspective view of the adhesive article 314a of the third embodiment shown in FIG. 15, following removal of the release liner 100, with the article turned over so that the adhesive layer 112 is on the lower side of the article depicted in FIG. 16. As shown in FIG. 16, the adhesive article 314a includes the second pattern 310 fully embedded in the adhesive, and the pattern of channels 122 formed by the first pattern 106 revealed as ridges 122a extending above the first surface 112c of the adhesive layer 112. The ridges 122a include in some areas the adhesive of the adhesive layer 112 and in some areas portions 310c of the second pattern 310, as shown in FIG. 16. The patterns 310 and channels 122, formed by application of the non-adhesive materials to the release liner (including removal of the first pattern 106 to form the channels 122), in which the both the pattern 310 and the channels 122 are at least partially embedded in the release liner 100, form a negative of the structure eventually formed in the adhesive layer 112. When the structure is transferred to the adhesive layer 112, the patterns are in reverse position in or on the adhesive layer 112 relative to the position in or on the release liner 100. As shown in FIG. 16, the adhesive article 314a, following removal of the release liner 100, has a continuous layer of adhesive 112 having a first surface 112c, a second surface 112a (not shown) and end edges 112b; a first pattern formed by the ridges 122a, a second pattern 310 of non-adhesive material forms, a portion of the pattern 310, which was more deeply embedded in the release surface of the release liner, now displayed in the ridges 122a of the adhesive layer 112, while the remaining portions of the non-adhesive material of the pattern are embedded in the surface 112c of the adhesive layer 112. That is, the top or first surface 310b of a portion of second pattern 310 is in the same plane as first surface 112c of the adhesive layer, and the first surface 310b another portion of second pattern 310 is in a plane that is different from the plane formed in the other portion of the second pattern. The first surface of the second pattern in the different planes provides air egress, repositionability and slideability.

In the embodiment shown in FIGS. 14, 15 and 16, the second pattern 310 has been applied at an angle of about 90° to the direction of the first pattern 106 and of the channel structure 122. As noted earlier, the second pattern may be applied at an angle of about 30°, about 45°, about 60°, about 75° or any other selected angle relative to the direction of the first pattern 106 and the channel structure 122.

In one embodiment, the adhesive articles of the invention, such as adhesive article 314a illustrated in FIG. 16 may be described as comprising a continuous layer of adhesive having a first surface and a second surface, and a first embossed pattern in the first surface of the adhesive layer, and a second pattern of non-adhesive material forms, wherein the second pattern at least partially overlaps the first pattern and is embedded in the first surface of the adhesive layer; each of said embossed pattern and second pattern has an exposed first surface wherein the first surface of at least a portion of the first embossed pattern is in a plane that is different from the plane of the first surface of at least a portion of the second pattern of non-adhesive forms.

In one embodiment, not shown with this third embodiment but substantially similar to the structure shown in FIG. 5 with respect to the first embodiment, a facestock is applied to the back surface 112a of the adhesive article 314a. In another embodiment, not shown, an additional release liner is applied to the back surface 112a of the adhesive article 314a.

The temperatures used to embed the non-adhesive material form into the molding layer in accordance to the methods of the invention depend on the materials used, but typically are in the range of about 150° to about 300° F. (about 65° C. to about 150° C.), or from about 200° to about 250° F. (about 93° C. to about 121° C.) for embedding into the release liner. The embedding pressure is also material dependent and may be between about 25 to about 150 pounds per square inch (psi) (about 1.7 Kg/cm$^2$ to about 11 Kg/cm$^2$), or from about 50 to about 100 psi (about 3.5 Kg/cm$^2$ to about 7 Kg/cm$^2$).

Figure 17:
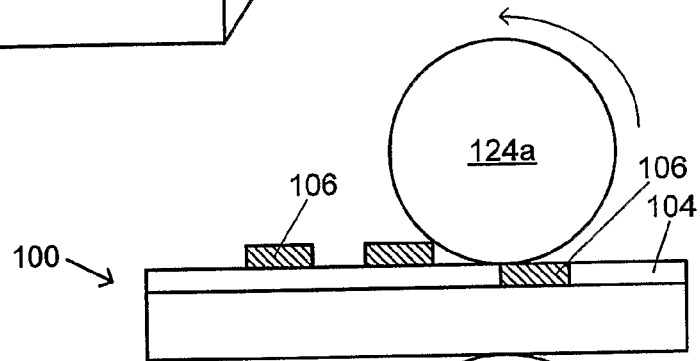
FIG. 17 is a schematic cross-sectional view depicting a method of embedding a non-adhesive material into a release liner, in accordance with an embodiment of the present invention.

FIG. 17 illustrates one embodiment of the embedding process. The embedding process uses a release liner with a moldable layer under the release surface, as described herein. In one embodiment, the molding layer is composed of polyolefins, such as low, medium and high density polyethylene, propylene or mixtures thereof. In one embodiment, the molding layer has a thickness of 10 µm to about 50 µm. In other embodiments, the thickness may be from about 20 µm to about 70 µm or from about 30 µm to about 60 µm.

Referring to FIG. 17, a release liner 100 is printed on the release surface 102 with non-adhesive material in a first pattern 106. The release liner 100 is passed through laminating rollers 124a and 124b. In one embodiment, the release liner and bottom laminating roller are heated, and the upper laminating roller is cooled. Other configurations may be used. The materials selected determine the heating and cooling configurations that may be used. The laminating rollers may be steel rollers, rubber rollers or a combination.

Figure 18:
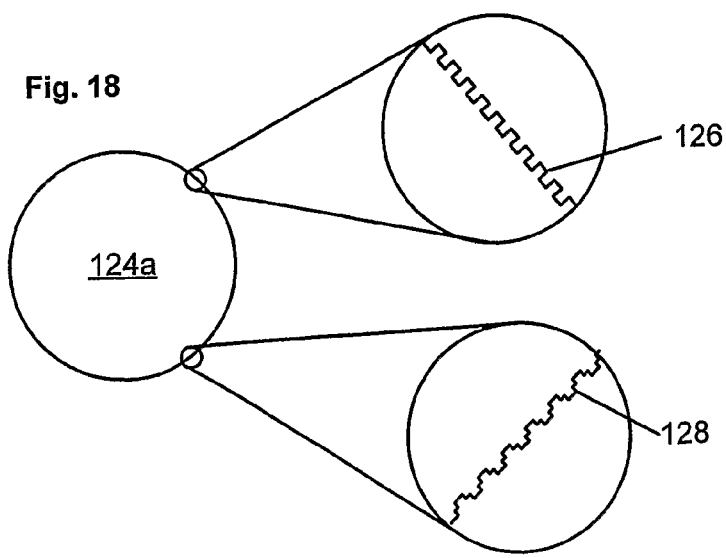
FIG. 18 is a schematic cross-sectional view depicting two embodiments of a textured surface of a roller used, for example, in embedding a non-adhesive material into a release liner, or for applying a texture to a release liner, in accordance with an embodiment of the present invention.

In another embodiment illustrated in FIG. 18, the upper roller 124a may include a textured surface. The textured surface may be used for applying the differential height pattern in the embedding steps of the method of the present invention or the textured surface may be used to apply the embossed patterns described herein. FIG. 18 schematically illustrates two possible embodiments of textured surfaces for use, e.g., on a laminating roller. In FIG. 18, the roller 124a includes a surface having either a first texture 126 or a second texture 128. As indicated in FIG. 18, the scale of the texturing may be quite small, and the scale is magnified for exemplification. In the first texture 126, the roller 124a has a substantially square-toothed appearance. In the second texture 128, the roller 124a has a two-level toothed appearance. It should be recognized that these textures are exemplary only, and many other textures may be used.

While the invention has been explained in relation to its preferred embodiments, it is to be understood that various modifications thereof will become apparent to those skilled in the art upon reading the specification. The features of the various embodiments of the adhesive articles described herein may be combined into within an adhesive article. The various methods of manufacturing the adhesive articles of the present invention described herein may also be combined. Therefore, it is to be understood that the invention disclosed herein is intended to cover such modifications as fall within the scope of the appended claims.

The invention claimed is:

1. An adhesive article comprising:
a continuous layer of adhesive having a first surface, a second surface and end edges, and
a first pattern of first non-adhesive material forms and a second pattern of second non-adhesive material forms wherein the second pattern partially overlaps the first pattern; at least one of said first and second patterns is at least partially embedded in the first surface of the adhesive layer; each of said first and second patterns has an exposed first surface and an opposite second surface that is in contact with the adhesive; the first surface of at least a portion of the first pattern of non-adhesive forms is in a plane that is different from the plane of the first surface of at least a portion of the second pattern of non-adhesive forms; and at least a portion of the first pattern protrudes from the first surface of the adhesive layer.

2. The adhesive article of claim 1 further comprising a facestock adhered to the second surface of the adhesive layer.

3. The adhesive article of claim 1 further comprising a release liner adhered to the second surface of the adhesive layer.

4. An adhesive article comprising:
a release liner comprising a release surface, a molding layer and a second surface;
a continuous layer of adhesive having a first surface, a second surface and end edges, wherein the first surface of the adhesive is adhered to the release surface of the release liner;
a first pattern of first non-adhesive material forms having a first surface and a second surface; and
a second pattern of second non-adhesive material forms having a first surface and a second surface, wherein the second pattern partially overlaps the first pattern; at least one of the first and second patterns is at least partially embedded in the release surface and molding layer of the release liner; the first surface of each of the two patterns is in contact with the release surface of the release liner, the second surface of each of the two patterns is in contact with the adhesive layer; and
the first surface of at least a portion of the first pattern of non-adhesive material forms is in a plane that is different from the plane of the first surface of at least a portion of the second pattern of non-adhesive material forms.

5. The adhesive article of claim 4 wherein each of the non-adhesive material forms independently has an average thickness of about 30 nanometers to about 100 µm.

6. The adhesive article of claim 4 wherein each of the non-adhesive material forms independently has an average thickness of about 3 µm to about 30 µm.

7. The adhesive article of claim 4 wherein each pattern of non-adhesive material forms independently is applied by printing, vacuum metallization or sputtering.

8. The adhesive article of claim 4 wherein at least one of the non-adhesive materials independently comprises at least one printing ink, UV curable ink or coalescing ink.

9. The adhesive article of claim 4 wherein each pattern of non-adhesive material forms independently comprises a plurality of dots, lines or combinations thereof.

10. The adhesive article of claim 4 wherein each pattern of non-adhesive material forms independently comprises a plurality of lines having an average width of from about 12 µm to about 250 µm and an average thickness of from about 30 nanometers to about 100 µm.

11. The adhesive article of claim 4 wherein the each pattern of non-adhesive material forms independently comprises a plurality of lines, and wherein at least 50% of the lines intersect the end edges of the adhesive layer.

12. The adhesive article of claim 4 wherein each pattern of non-adhesive material forms comprises a plurality of non-intersecting lines, and wherein the lines from the first pattern and the lines from the second pattern intersect to form a grid pattern.

13. The adhesive article of claim 4 wherein the adhesive layer comprises a pressure sensitive adhesive or a heat-activated adhesive.

14. The adhesive article of claim 4 wherein at least one of the first and second non-adhesive material comprises a porous non-adhesive material.

15. The adhesive article of claim 14 wherein the porous non-adhesive material comprises an elastomer.

16. The adhesive article of claim 4 wherein the adhesive is a pressure sensitive adhesive.

17. The adhesive article of claim 4 wherein the release surface of the release liner has a textured or matte surface.

18. The adhesive article of claim 17 wherein the first surface of the adhesive layer has a textured surface that is complementary to the textured surface of the release liner.

19. The adhesive article of claim 4 wherein the release surface of the release liner has a Sheffield roughness of at least about 50.

20. The adhesive article of claim 4 further comprising a facestock adhered to the second surface of the adhesive layer.

21. The adhesive article of claim 4 further comprising a second release liner adhered to the second surface of the adhesive layer.

22. The adhesive article of claim 4 wherein the second surface of the release liner has a release coating thereon.

23. The adhesive article of claim 22 further comprising a facestock having a first and second surface wherein the first surface is in contact with the second surface of the adhesive layer and a second adhesive layer having a first and second surface wherein the first surface of the second adhesive layer is in contact with the second surface of the facestock.

24. The adhesive article of claim 23 further comprising a second release liner adhered to the second surface of the second adhesive layer.

* * * * *